(12) United States Patent
Morita et al.

(10) Patent No.: US 8,971,814 B2
(45) Date of Patent: Mar. 3, 2015

(54) RADIO COMMUNICATION SYSTEM, RADIO RESOURCE DETERMINATION METHOD THEREFOR, COMMUNICATION MANAGEMENT DEVICE, AND CONTROL METHOD AND CONTROL PROGRAM FOR COMMUNICATION MANAGEMENT DEVICE

(75) Inventors: Motoki Morita, Tokyo (JP); Kojiro Hamabe, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 15 days.

(21) Appl. No.: 13/818,155

(22) PCT Filed: Aug. 17, 2011

(86) PCT No.: PCT/JP2011/004605
§ 371 (c)(1),
(2), (4) Date: Feb. 21, 2013

(87) PCT Pub. No.: WO2012/042730
PCT Pub. Date: Apr. 5, 2012

(65) Prior Publication Data
US 2013/0157680 A1    Jun. 20, 2013

(30) Foreign Application Priority Data
Sep. 28, 2010   (JP) .................................. 2010-217089

(51) Int. Cl.
*H04B 1/00*   (2006.01)
*H04W 72/08*   (2009.01)
(Continued)

(52) U.S. Cl.
CPC .......... *H04W 72/082* (2013.01); *H04W 52/244* (2013.01); *H04W 24/08* (2013.01); *H04W 84/105* (2013.01)

USPC ...... 455/63.1; 455/63.2; 455/63.3; 455/552.1

(58) Field of Classification Search
CPC . H04W 72/082; H04W 72/085; H04W 72/04; H04W 72/00; H04W 52/24; H04W 52/241; H04W 52/243; H04W 52/244
USPC ............... 455/63.1, 63.2, 67.13, 550.1, 552.1
See application file for complete search history.

(56) References Cited

U.S. PATENT DOCUMENTS

2008/0188265 A1   8/2008   Carter et al.
2010/0035617 A1   2/2010   Whinnett
(Continued)

FOREIGN PATENT DOCUMENTS

GB    2 428 937 A   2/2007
JP    2010-004187 A   1/2010
(Continued)

*Primary Examiner* — Jean Gelin
(74) *Attorney, Agent, or Firm* — Sughrue Mion, PLLC

(57) ABSTRACT

In order to effectively determine an optimized radio resource, a radio communication system (100) includes a plurality of first base stations (111) and a plurality of first mobile stations (112) respectively connected to the plurality of first base stations (111). In the radio communication system (100), there are included calculation means (103) for calculating a statistic (130) by aggregating interference levels of radio waves between the plurality of first base stations (111) and second mobile stations (122) connected to a second base station (121) that forms a second cell (120) larger than a first cell (110) formed by each of the first base stations (111); and determination means (104) for determining, based on the statistic (130), a radio resource to be used by the plurality of first base stations (111) or the plurality of first mobile stations (112).

17 Claims, 21 Drawing Sheets

(51) Int. Cl.
*H04W 52/24* (2009.01)
*H04W 24/08* (2009.01)
*H04W 84/10* (2009.01)

(56) References Cited

U.S. PATENT DOCUMENTS

| | | | |
|---|---|---|---|
| 2010/0061317 A1* | 3/2010 | Gorokhov et al. | 370/329 |
| 2011/0003559 A1* | 1/2011 | Morita et al. | 455/67.14 |
| 2011/0117967 A1* | 5/2011 | Vedantham et al. | 455/561 |
| 2012/0129567 A1* | 5/2012 | Kimura et al. | 455/522 |
| 2012/0142334 A1* | 6/2012 | Sato et al. | 455/422.1 |
| 2013/0229933 A1* | 9/2013 | Ji et al. | 370/252 |

FOREIGN PATENT DOCUMENTS

| | | |
|---|---|---|
| JP | 2010-045782 A | 2/2010 |
| JP | 2010-518668 A | 5/2010 |
| WO | 2009/047972 A1 | 4/2009 |
| WO | 2009/122778 A1 | 10/2009 |

* cited by examiner

RADIO COMMUNICATION SYSTEM, RADIO RESOURCE DETERMINATION METHOD THEREFOR, COMMUNICATION MANAGEMENT DEVICE, AND CONTROL METHOD AND CONTROL PROGRAM FOR COMMUNICATION MANAGEMENT DEVICE

This application is a National Stage of International Application No. PCT/JP2011/004605 filed Aug. 17, 2011, claiming priority based on Japanese Patent Application No. 2010-217089 filed Sep. 28, 2010, the contents of all of which are incorporated herein by reference in their entirety.

TECHNICAL FIELD

The present invention relates to a technique for determining a radio resource in a radio communication system formed by a plurality of first cells and a second cell including the plurality of first cells.

BACKGROUND ART

In a radio communication system where there are a plurality of femtocells within a macro cell controlled by a macro base station, the downlink transmission power of each femto base station affects a macro mobile station in the macro cell. Accordingly, some measures have been taken to prevent the downlink transmission power of each femto base station from interfering in the communication of the macro mobile station. For example, Patent Literature 1 discloses processing for controlling the downlink transmission power of each femto base station in consideration of a reception level of a reference signal transmitted from a macro base station.

Incidentally, in a case where a femto base station is located in a building and a femto base station is located indoors, it is possible to prevent interference to a macro mobile station located outdoors even if the downlink transmission power of the femto base station is increased by the amount corresponding to a building penetration loss due to e.g., walls of buildings and a space propagation loss. Therefore, in Patent Literature 2, a femto base station measures the reception power at the femto base station of a reference signal from a macro base station, and the reception power at the femto base station of an uplink transmission power from a macro mobile station to the macro base station. Then, the femto base station obtains a path loss (=building penetration loss+ space propagation loss) between the femto base station and the macro mobile station based on the estimated transmission power of the macro mobile station and the reception power of the uplink transmission power measured by the femto base station. The transmission power of the femto base station is obtained in consideration of this path loss. Further, in Patent Literature 3, a femto base station firstly measures the reception quality of a reference signal from a macro base station, and adds a power offset to thereby set an initial value of transmission power (transmission power of the reference signal and a maximum value of the transmission power). Next, upon receiving from a femto mobile station a report on the measurement result of the reception quality using the initial value, the femto base station reconfigures the transmission power of the femto base station so that the reception quality in the femto mobile station approaches a target level. This allows the reception quality in the femto mobile station to be maintained while preventing interference to the macro mobile station.

On the other hand, in Patent Literature 4, under a predetermined condition in which an unregistered macro mobile equipment exists in a femtocell, a femto base station changes a downlink perch channel signal to thereby change the radius of a downlink femtocell. The uplink reception sensitivity is changed, as needed, in accordance with the change in the radius of the downlink femtocell, thereby controlling the radius of an uplink femtocell to be prevented from being greatly different from the radius of the downlink femtocell. This control prevents interference to the femto base station due to the uplink transmission power from the macro mobile equipment to the macro base station.

CITATION LIST

Patent Literature

PTL1: UK Patent Application Publication No. 2428937
PTL2: International Patent Publication No. WO 2009/122778
PTL3: International Patent Publication No. WO 2009/047972
PTL4: Japanese Unexamined Patent Application Publication No. 2010-004187

SUMMARY OF INVENTION

Technical Problem

However, in the related arts described above, radio resources (for example, transmission power) within a femtocell are set per femtocell. In other words, radio resources of a femto base station and a femto mobile station in each femtocell are set based on the current reception levels at which a macro mobile station, the femto base station and the femto mobile station have detected the transmission power of each signal. Therefore, it is necessary for a newly set femtocell to measure the reception level of the transmission power of each signal and to set radio resources. If setting of radio resources is individually controlled for each femtocell located in the same macro cell, a load on each femto base station increases and an extra load is put on a macro station or the like.

It is an exemplary object of the present invention to provide a technique for solving the above-mentioned problems.

Solution to Problem

In order to achieve the above-mentioned object, a system according to a first exemplary aspect of the present invention is a radio communication system including a plurality of first base stations and a plurality of first mobile stations respectively connected to the plurality of first base stations. This system includes calculation means for calculating a statistic by aggregating interference levels of radio waves between the plurality of first base stations and second mobile stations connected to a second base station that forms a second cell larger than a first cell formed by each of the first base stations; and determination means for determining, based on the statistic, a radio source to be used by the plurality of first base stations or the plurality of first mobile stations.

In order to achieve the above-mentioned object, a method according to a second exemplary aspect of the present invention is a method of determining a radio resource in a radio communication system that includes a plurality of first base stations and a plurality of first mobile stations respectively connected to the plurality of first base stations. This method includes a calculation step of calculating a statistic by aggregating interference levels of radio waves between the plurality of first base stations and second mobile stations connected to a second base station that forms a second cell larger than a first cell formed by each of the first base stations; and a determination step of determining, based on the statistic, a radio resource to be used by the plurality of first base stations or the plurality of first mobile stations.

In order to achieve the above-mentioned object, a device according to a third exemplary aspect of the present invention is a communication management device that manages a plurality of first base stations and a plurality of first mobile stations respectively connected to the plurality of first base stations. This device includes calculation means for calculating a statistic by aggregating interference levels of radio waves between the plurality of first base stations and second mobile stations connected to a second base station that forms a second cell larger than a first cell formed by each of the first base stations; and determination means for determining, based on the statistic, a radio source to be used by the plurality of first base stations or the plurality of first mobile stations.

In order to achieve the above-mentioned object, a method according to a fourth exemplary aspect of the present invention is a method of controlling a communication management device that manages a plurality of first base stations and a plurality of first mobile stations respectively connected to the plurality of first base stations. This method includes a calculation step of calculating a statistic by aggregating interference levels of radio waves between the plurality of first base stations and second mobile stations connected to a second base station that forms a second cell larger than a first cell formed by each of the first base stations; and a determination step of determining, based on the statistic, a radio resource to be used by the plurality of first base stations or the plurality of first mobile stations.

In order to achieve the above-mentioned object, a program according to a fifth exemplary aspect of the present invention is a program for controlling a communication device that manages a plurality of first base stations and a plurality of first mobile stations respectively connected to the plurality of first base stations. This program causes a computer to execute a calculation step of calculating a statistic by aggregating interference levels of radio waves between the plurality of first base stations and second mobile stations connected to a second base station that forms a second cell larger than a first cell formed by each of the first base stations; and a determination step of determining, based on the statistic, a radio resource to be used by the plurality of first base stations or the plurality of first mobile stations.

Advantageous Effects of Invention

According to the present invention, it is possible to effectively achieve determination of an optimized radio resource in a radio communication system.

DESCRIPTION OF EMBODIMENTS

Hereinafter, exemplary embodiments of the present invention will be described in detail with reference to the drawings. However, elements described in the following exemplary embodiments are illustrated by way of example only, and the technical scope of the present invention is not limited to them.

First Exemplary Embodiment

Figure 1:
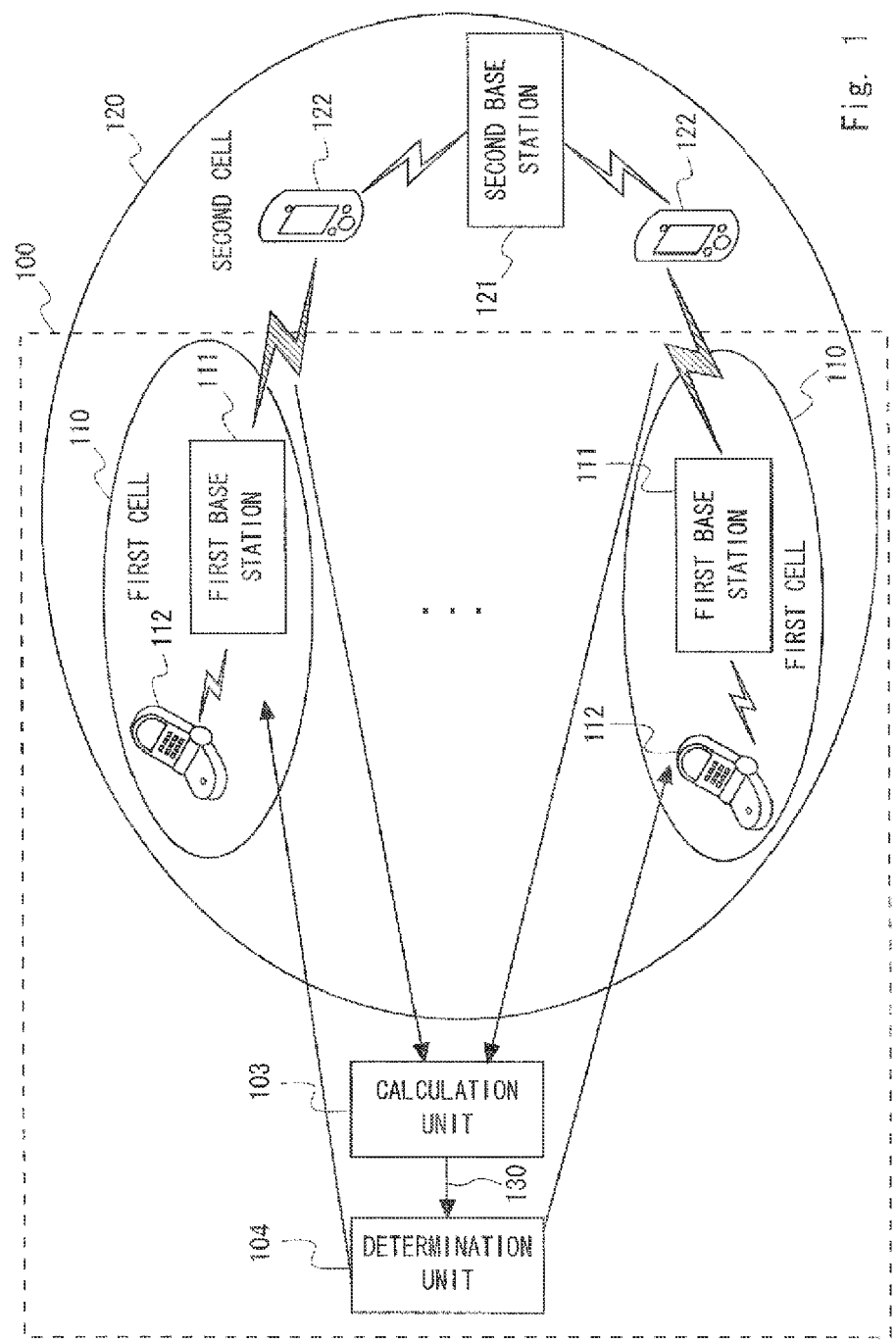
FIG. 1 is a diagram showing a configuration of a radio communication system according to a first exemplary embodiment of the present invention.

A radio communication system will be described with reference to FIG. 1 as a first exemplary embodiment of the present invention. FIG. 1 shows a radio communication system 100 including a plurality of first base stations 111 and a plurality of first mobile stations 112 which are respectively connected to the first base stations 111.

The radio communication system 100 further includes a calculation unit 103 and a determination unit 104. The calculation unit 103 calculates a statistic 130 by aggregating interference levels of radio waves between the plurality of first base stations 111 and a second mobile station 122 connected to a second base station 121 which forms a second cell 120 that is larger than a first cell 110 formed by the first base station 111. The determination unit 104 determines a radio resource to be used by the plurality of first base stations 111 or the plurality of first mobile stations 112, based on the statistic 130.

Thus, the determination of the radio resource based on the statistic makes it possible to effectively determine an optimized radio resource.

Second Exemplary Embodiment

Figure 2:
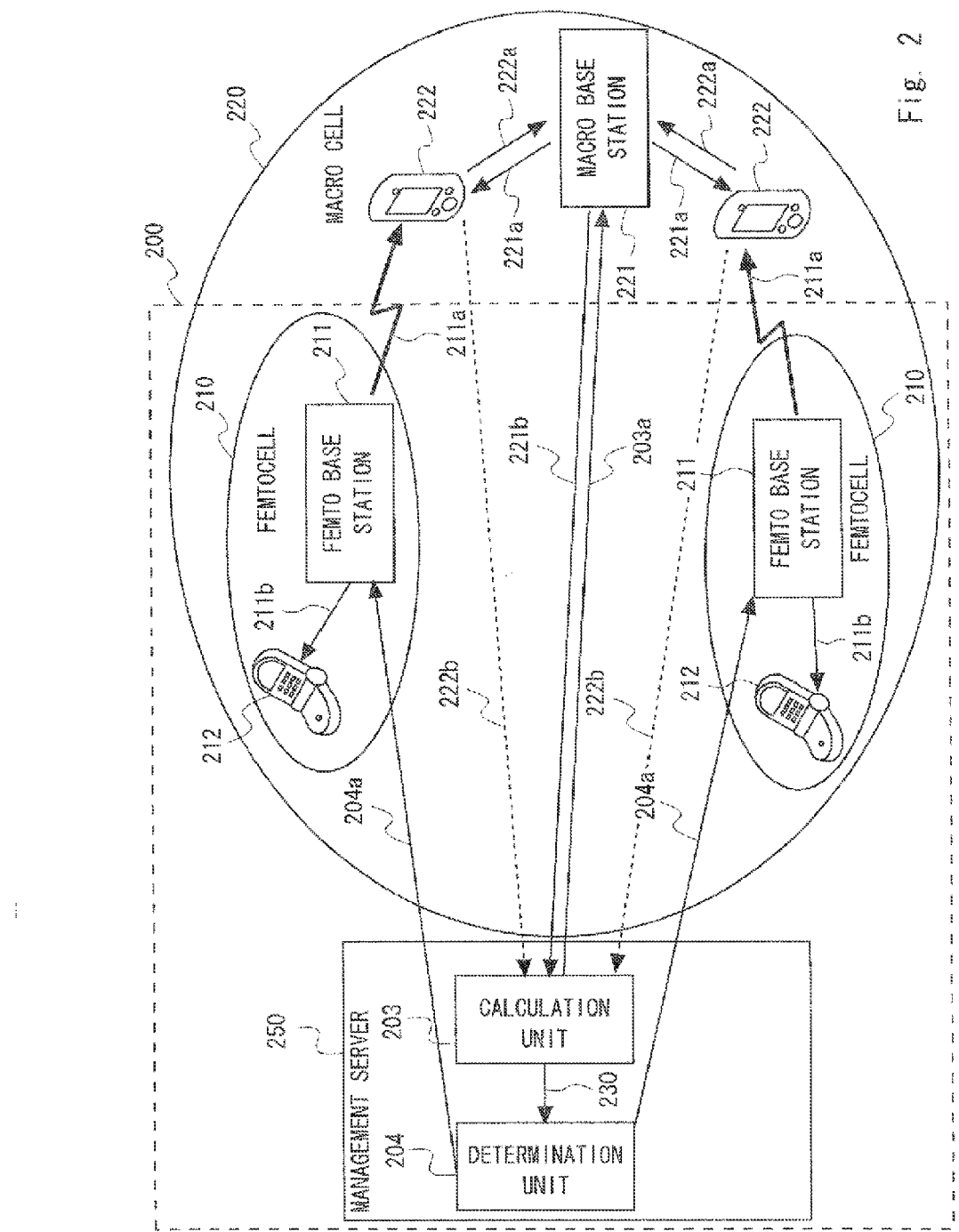
FIG. 2 is a diagram showing a configuration of a radio communication system according to a second exemplary embodiment of the present invention.

A radio communication system according to a second exemplary embodiment of the present invention will be described with reference to FIGS. 2 to 6B. In this exemplary embodiment, a radio resource to be used by a plurality of femto base stations is determined based on a statistic calculated by aggregating values from macro mobile stations. FIG. 2 illustrates, as a typical example, an example in which downlink transmission power of a plurality of femto base stations 211 is determined based on a first statistic 230 with respect to a plurality of femtocells 210 in a macro cell 220. Hereinafter, the term "first statistic" refers to a statistic obtained by aggregating reception levels at macro mobile stations of radio waves from a plurality of femto base stations.
<Configuration and Operation of Radio Communication System According to Second Exemplary Embodiment>

FIG. 2 shows a configuration of a radio communication system 200 according to the second exemplary embodiment which includes the plurality of femto base stations 211 and a plurality of femto mobile stations 212 connected to the plurality of femto base stations 211. The macro cell 220, which is larger than each femtocell 210 formed by each femto base station 211, includes a macro base station 221 and macro mobile stations 222 that are connected to the macro base station 221. Each femto base station 211 within each femtocell 210 communicates with the corresponding femto mobile station 212 by a radio signal 211b having the determined downlink transmission power. Though FIG. 2 shows one macro cell 220, the number of macro cells is not limited thereto. A management server 250 may calculate a statistic for each femtocell 210 within an area covering a plurality of macro cells 220, and may determine the radio resource for each femto base station 211.

The second exemplary embodiment illustrates an example in which a calculation unit 203 and a determination unit 204 are provided in the management server 250 serving as a communication management device that manages the plurality of femtocells 210. However, the functions of the calculation unit 203 and the determination unit 204 may be disposed in other elements such as the macro base station 221, may be disposed in a distributed manner in the femto base stations 211, or may be disposed in other elements in the radio communication system. The calculation unit 203 transmits a measurement instruction signal 203a to the macro base station 221, to thereby request the macro base station 221 to instruct, by a measurement instruction signal 221a, the macro mobile station 222 to perform measurement. The calculation unit 203 calculates the first statistic 230 by aggregating reception levels 222a at the macro mobile stations 222 of radio waves 211a from the plurality of femto base stations 211, or aggregating reception levels 222b at the macro mobile stations 222. The reception levels 222a are reported, as transmission data 221b, from the macro mobile stations 222 to the management server 250 via the macro base station 221 in response to each measurement instruction signal 221a from the macro base station 221. On the other hand, reception levels 222b are transmitted from the macro mobile stations 222 directly to the management server 250 in this example. The determination unit 204 determines a radio resource 204a such as downlink transmission power, which is used by the plurality of femto base stations 211, based on the first statistic 230.

Figure 3:
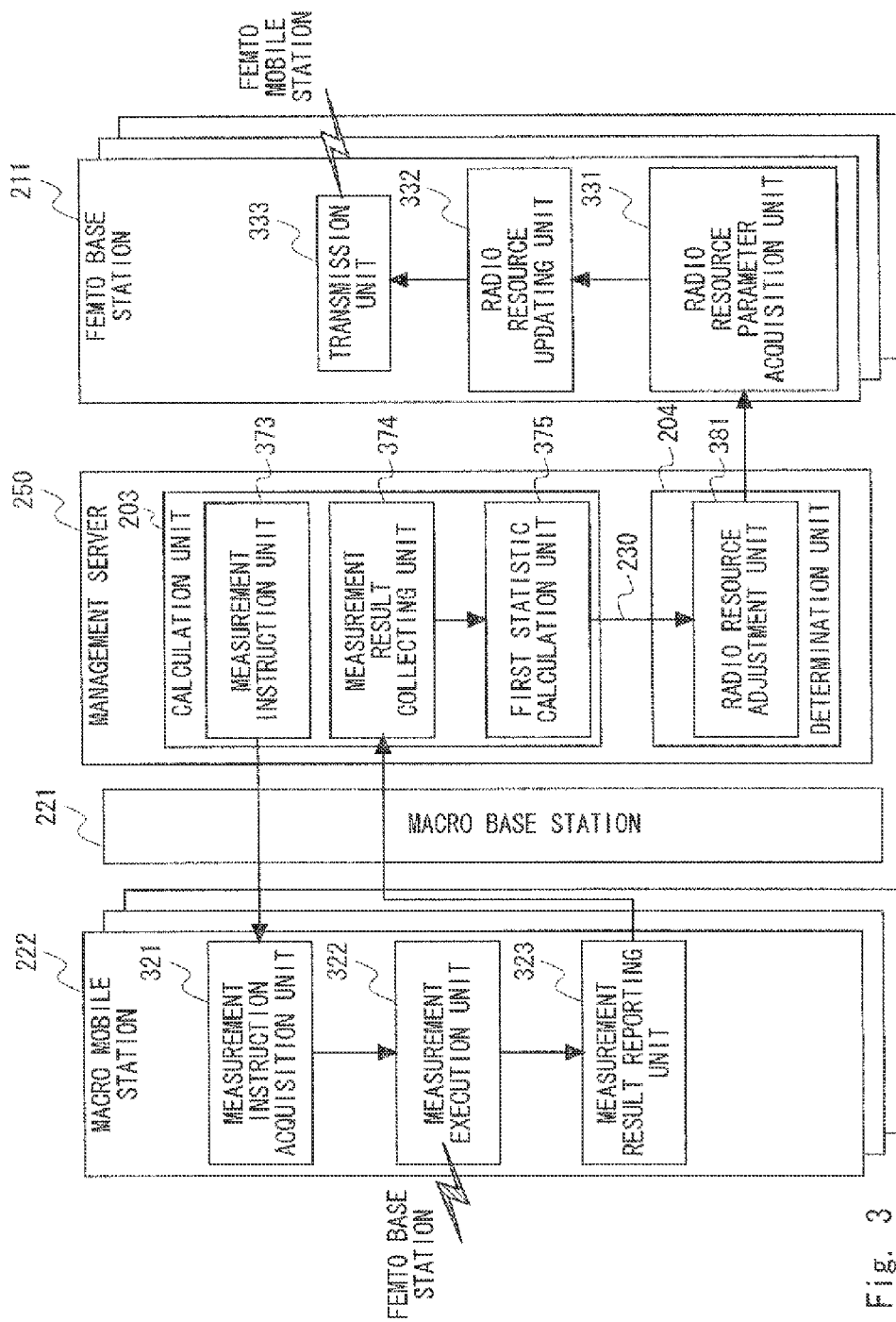
FIG. 3 is a block diagram showing the configuration of the radio communication system according to the second exemplary embodiment of the present invention.

FIG. 3 is a block diagram showing the configuration of each element shown in FIG. 2. Note that in FIG. 3, reporting of measurement results of the reception levels 222a via the macro base station 221 is illustrated in a simplified manner.

A measurement instruction unit 373 included in the calculation unit 203 of the management server 250 transmits a measurement instruction to the macro mobile stations 222 located in the vicinity of each femtocell within the macro cell (via the macro base station 221). In each macro mobile station 222, a measurement instruction acquisition unit 321 receives the measurement instruction from the measurement instruction unit 373, and a measurement execution unit 322 measures the reception level of interference 211a from the neighboring femto base station 211. A measurement result reporting unit 323 reports the measured reception level to the management server 250 (via the macro base station 221).

A measurement result collecting unit 374 of the management server 250 collects the measurement results of the reception level from the macro mobile stations 222, and transmits the results to a first statistic calculation unit 375. The first statistic calculation unit 375 calculates the first statistic 230 and transmits the first statistic to a radio resource adjustment unit 381 in the determination unit 204. The radio resource adjustment unit 381 determines a parameter for adjusting the radio resource for each femto base station 211 by using the first statistic 230, and sets the parameter to all the femto base stations 211 to be aggregated.

In each of the femto base stations 211 to be aggregated, a radio resource parameter acquisition unit 331 acquires the radio resource/parameter common within the macro cell 220 from the management server 250, and a radio resource updating unit 332 updates the acquired radio resource. A transmission unit 333 transmits, to the femto mobile station 212, a radio signal 211b having the updated radio resource, i.e., downlink transmission power in this example.

Figure 4:
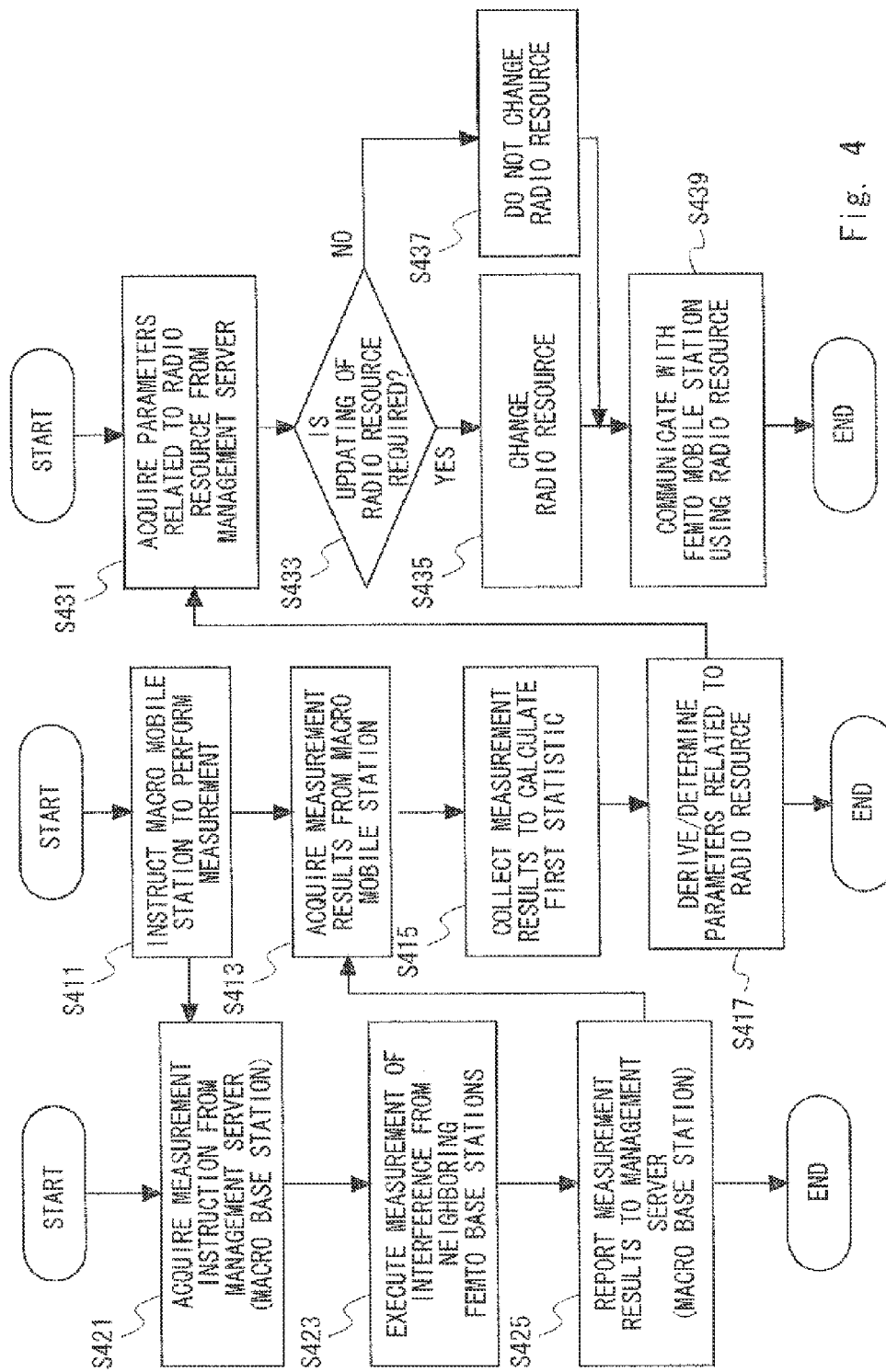
FIG. 4 is a flowchart showing a procedure in the radio communication system according to the second exemplary embodiment of the present invention.

FIG. 4 shows a flowchart of an operation procedure for each element according to the second exemplary embodiment. Also in FIG. 4, the illustration of collection of assumed results via the macro base station 221 is omitted.

In step S411, the management server 250 transmits a measurement instruction to each macro mobile station 222. Each macro mobile station 222 acquires the measurement instruction from the management server 250 (via the macro base station 221) in step S421, and then measures, as a reception level, interference 211a from the neighboring femto base station 211 in step S423. In step S425, each macro mobile station 222 reports the reception level as the measurement result to the management server 250 (via the macro base station 221).

The management server 250 acquires the measurement results from the macro mobile stations 222 in step S413, and collects the measurement results from the macro mobile stations 222 to calculate the first statistic 230 in step S415. In step S417, the management server 250 derives a parameter related to the radio resource based on the calculated first statistic 230, and sets the parameter to all the femto base stations 211 to be aggregated. Note that the setting of the parameter related to the radio resource to the femto base stations 211 may be performed for each femto base station 211, or may be performed simultaneously by the macro base station 221 for each macro cell 220.

Each of the femto base stations 211 to be aggregated acquires the parameter related to the radio resource common within the macro cell 200 in step S431, and then judges whether or not it is necessary to update the radio resource in step S433. If it is necessary to update the radio resource, each femto base station 211 changes the radio resource in step S435. On the other hand, if it is not necessary to update the radio resource, each femto base station 211 maintains the radio resource as it is in step S437. In step S439, each femto base station 211 communicates with the femto mobile station 212 by the radio signal 211b using the current radio resource. Here, each femto base station 211 performs transmission using the set downlink transmission power.

Note that the processings of the first statistic calculation unit 375 and the radio resource adjustment unit 381 include processings using various first statistics 230. Some examples thereof will be given below as second to fifth exemplary embodiments in this order.

<Configuration of Management Server 250>

Figure 5:
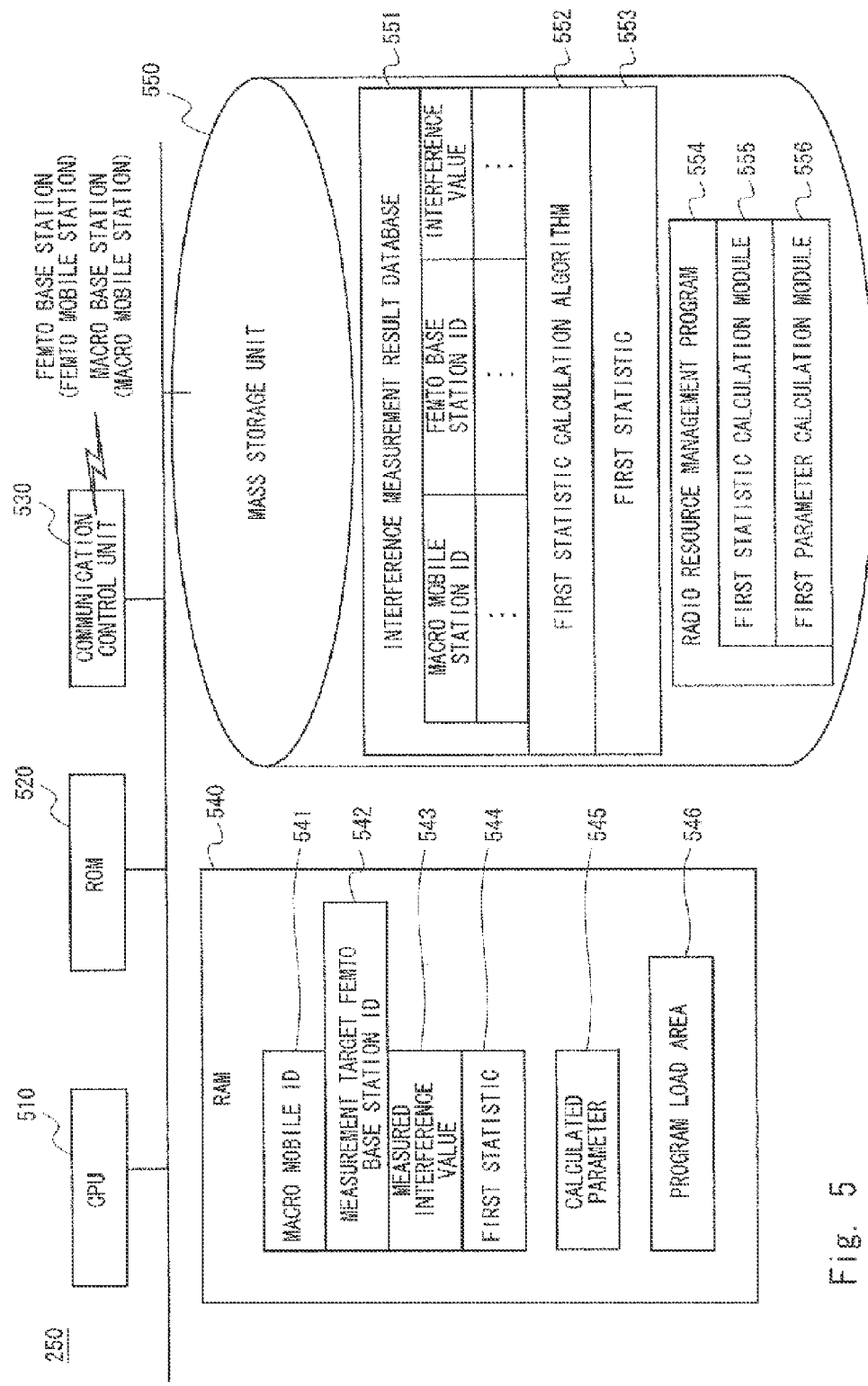
FIG. 5 is a block diagram showing a configuration of a management server according to the second exemplary embodiment of the present invention.

FIG. 5 is a block diagram showing the configuration of the management server 250 according to the second exemplary embodiment.

Referring to FIG. 5, a CPU (Central Processing Unit) 510 is a processor for arithmetic control, and executes programs to implement each unit of the management server 250 shown in FIG. 3. A ROM (Read Only Memory) 520 stores fixed data and programs such as initial data and program. A communication control unit 530 communicates with the femto base stations 211, the femto mobile stations 212, the macro base station 221 and the macro mobile stations 222 via a network.

A RAM (Random Access Memory) 540 is used by the CPU 510 as a work area for temporary storage. In the RAM 540, areas for storing the following data necessary to implement this exemplary embodiment are reserved. An area 541 stores a macro mobile station ID for identifying each macro mobile station 222 which has measured the acquired reception level. An area 542 stores a measurement target femto base station ID for identifying each femto base station 211 that controls the macro cell 220 in the vicinity of which the macro mobile station 222 having the macro mobile station ID is located. An area 543 stores the measured interference value (reception level) measured by the macro mobile station 222 having the macro mobile station ID. An area 544 stores the first statistic 230 collected and calculated by the management server 250. An area 545 stores the calculated parameter for the radio resource calculated based on the first statistic 230. An area 546 is a program load area for loading a program to be executed by the CPU 510.

Figure 6A:
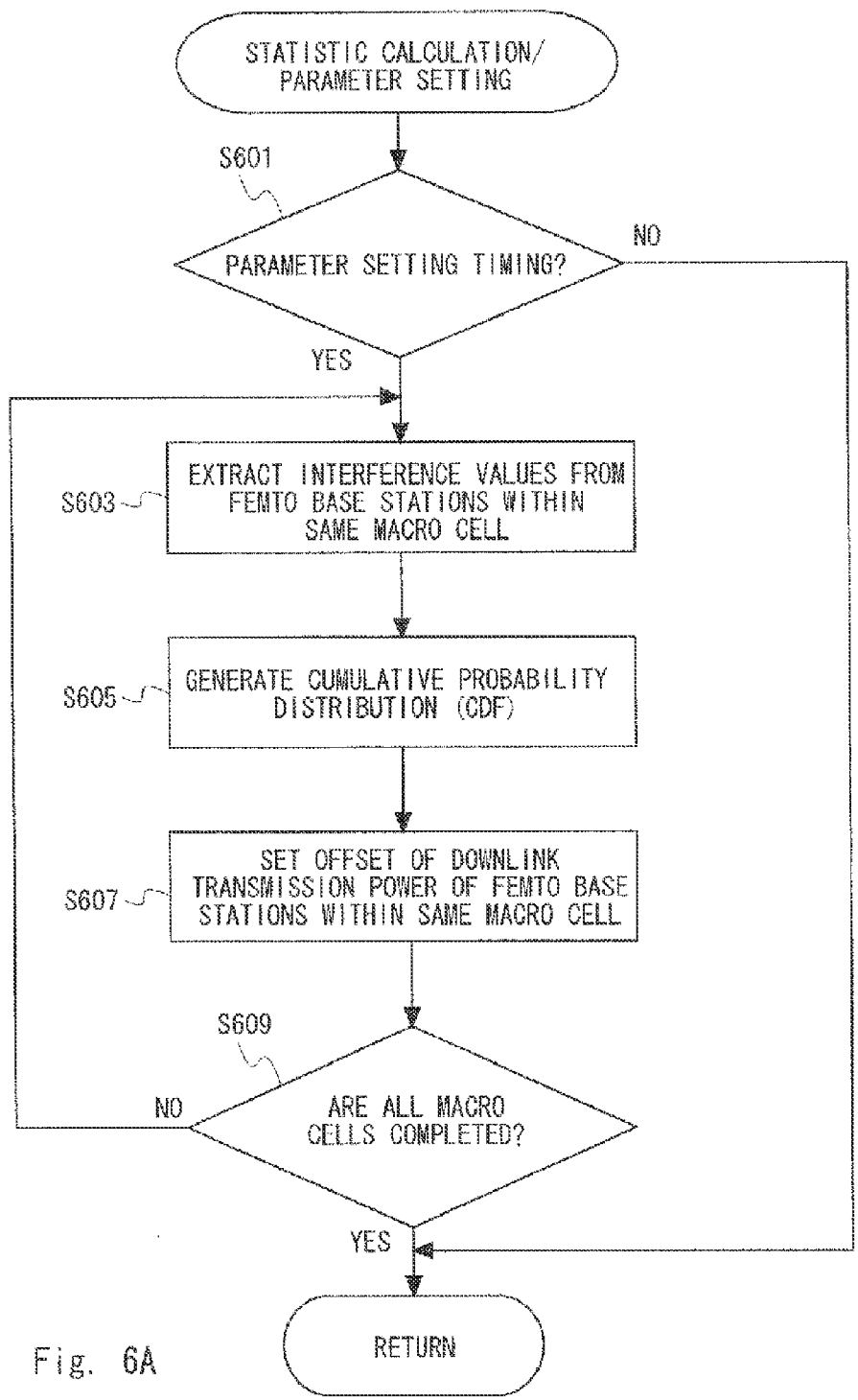
FIG. 6A is a flowchart showing a procedure in the management server according to the second exemplary embodiment of the present invention.

A mass storage unit 550 such as a disk stores, in a non-volatile manner, data such as the measurement results collected from the macro mobile stations 222 and application programs to be executed by the CPU 510. The mass storage unit 550 stores the following data or programs necessary to implement this exemplary embodiment. An interference measurement result collection database 551 stores the interference values (reception levels), which are the measurement results collected from the macro mobile stations 222, in a manner linked to the macro mobile station ID and the femto base station ID. A first statistic calculation algorithm 552 stores an algorithm for obtaining the first statistic 230 from the collected interference values. As a first statistic 553, there is stored the first statistic 230 calculated by the first statistic calculation algorithm 552. In the case of managing femtocells 210 in a plurality of macro cells 220, a plurality of first statistics 230 is stored so as to respectively correspond to the macro cells 220. Next, as a program, a radio resource management program 554 for causing the overall processing to be executed is stored. A first statistic calculation module 555 is a module for calculating the first statistic 230 in accordance with the first statistic calculation algorithm 552 as shown in FIG. 6A described below. A first parameter calculation module 556 is a mode for calculating the first parameter for the radio resource set to each femto base station 211 based on the first statistic 230 as shown in FIG. 6A described below.

<Operations of Second Exemplary Embodiment for Statistic Calculation and Parameter Setting in Management Server>

FIG. 6A shows a flowchart of an operation procedure of the second exemplary embodiment for statistic calculation and parameter setting in the management server. In the second exemplary embodiment, an offset of the downlink transmission power of each femto base station 211 is controlled by a cumulative probability distribution (which is represented by a cumulative distribution function, so it is hereinafter referred to as "CDF") of the interference levels collected by the macro mobile stations 222.

Figure 6B:
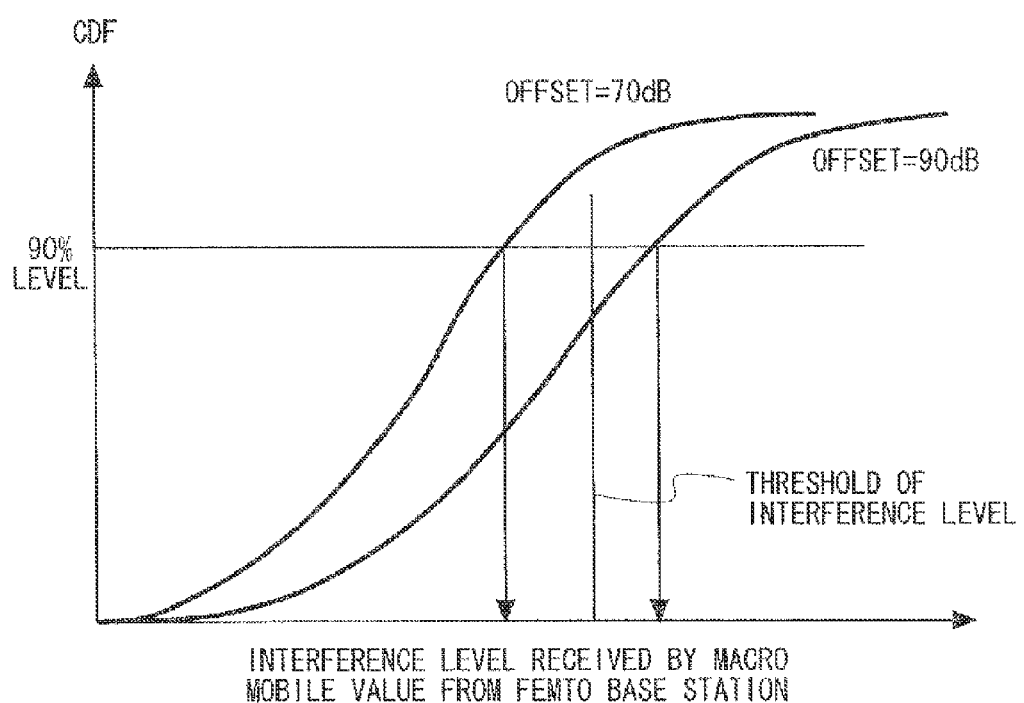
FIG. 6B is a diagram showing an example of an offset of downlink transmission power determined in the second exemplary embodiment of the present invention.

In step S601, the management server 250 judges whether a setting timing for setting the parameter for the radio resource has been reached or not. Examples of the setting timing may include a predetermined timing at a predetermined date and time, a timing at which the reception level that satisfies conditions for calculating the first statistic is collected, and a timing at which interference to a macro mobile station reaches a level that causes a fault. At the setting timing, the management server 250 proceeds to step S603 and extracts the interference values, which are obtained from the femto base stations within the same macro cell, from the interference values measured and collected by the macro mobile stations. In step S605, the management server 250 creates the cumulative probability distribution (CDF) at the interference levels as shown in FIG. 6B. In step S607, the management server 250 obtains, based on FIG. 6B, the interference levels at which the cumulative value reaches a 90% value at each offset (in FIG. 6B, offset=70 dB and offset=90 dB are shown). Then, the management server 250 selects the offset at which the obtained interference level is equal to or smaller than a threshold, and uses the offset as a parameter for the set radio resource. In the example of FIG. 6B, the management server 250 selects offset=70 dB. In step S609, the management server 250 determines whether the setting for all macro cells to be managed is completed, and when the setting is not completed, returns to step S603 to repeat the processing. Accordingly, the first statistic in the second exemplary embodiment corresponds to the cumulative probability distribution (CDF), and the parameter for the radio resource corresponds to the offset of the downlink transmission power.

Third Exemplary Embodiment

A radio communication system according to a third exemplary embodiment of the present invention will be described with reference to FIG. 7. In the second exemplary embodiment, the offset of the downlink transmission power is determined based on the cumulative probability distribution (CDF) at each interference level. On the other hand, in this exemplary embodiment, the offset of the downlink transmission power is determined based on a ratio of femto base stations from which an interference detection ratio within a macro cell exceeds a threshold. The other configurations and operations are similar to those of the second exemplary embodiment, so the description thereof is herein omitted.

<Operations of Third Exemplary Embodiment for Statistic calculation and Parameter Setting in Management Server>

Figure 7:
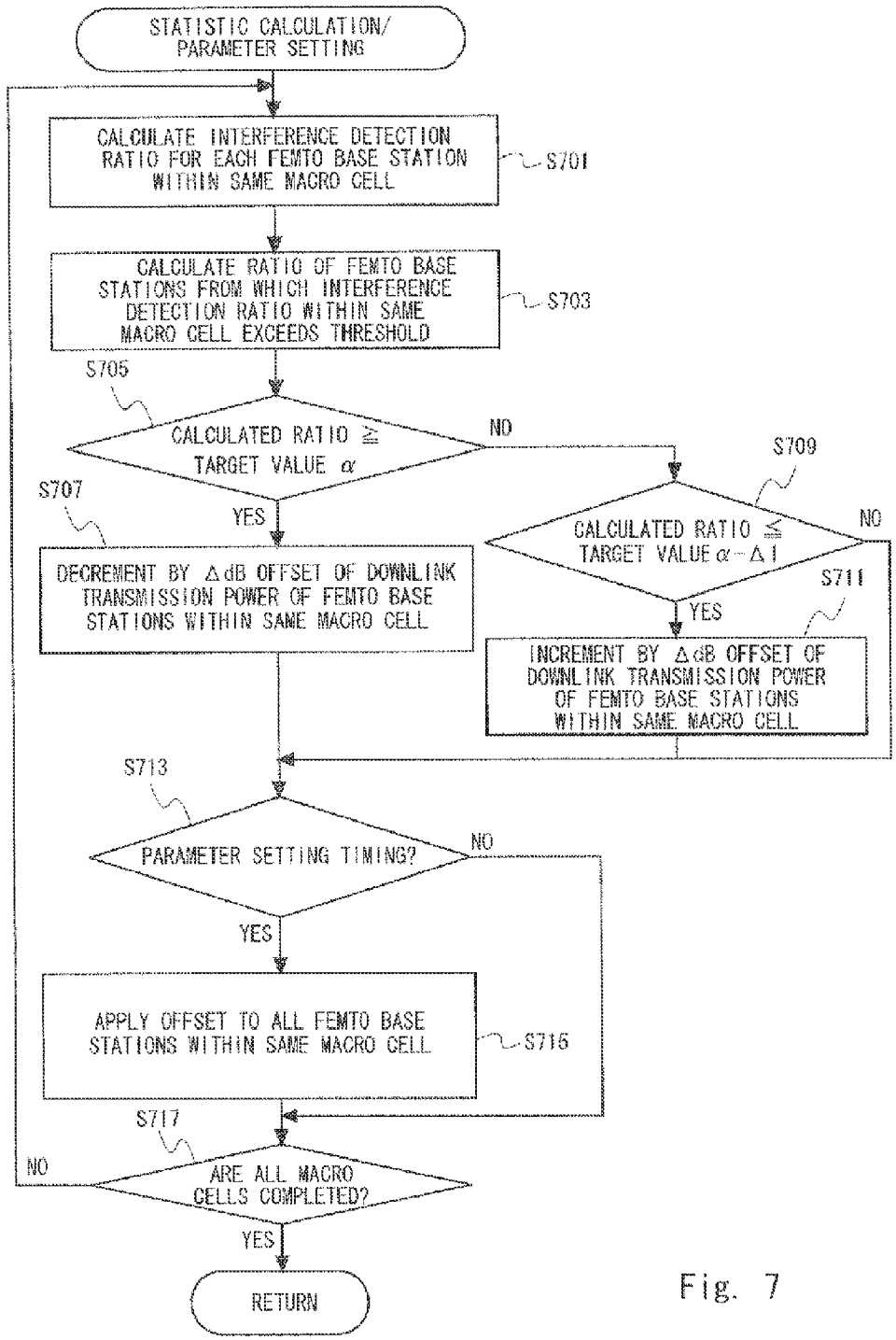
FIG. 7 is a flowchart showing a procedure in a management server according to a third exemplary embodiment of the present invention.

FIG. 7 shows a flowchart of an operation procedure of the third exemplary embodiment for statistic calculation and parameter setting in the management server.

In step S701, the management server 250 calculates the interference detection ratio indicating a detection ratio of interference from each femto base station within the same macro cell from the interference values measured and collected by the macro mobile stations. The interference detection ratio is calculated, for each femto base station, as the interference detection ratio=(the number of reports that interference is detected/the number of macro mobile stations instructed to detect interference). Examples of the above-mentioned interference detection include the cases where the following conditions are satisfied in addition to the reception levels at each macro mobile station. That is, (Example 1) a case where the RSRQ in a femtocell/the RSRQ in a macro cell is equal to or greater than the threshold; (Example 2) a case where the RSRQ in the femtocell is equal to or greater than the threshold; (Example 3) a case where Detected Cell is reported; and (Example 4) a case where the RSRP (Reference Signal Received power) in the femtocell is equal to or greater than the threshold, for example. In step S703, the management server 250 calculates the ratio of femto base stations from which the interference detection ratio within the same macro cell exceeds the threshold. In step S705, the management server 250 judges whether the calculated ratio of femto base stations is equal to or greater than a target value α. When the calculated ratio of femto base stations is equal to or greater than the target value α, the management server 250 proceeds to step S707, and decrements by (ΔdB) the offset of the downlink transmission power of the femto base stations within the same macro cell. On the other hand, when the calculated ratio of femto base stations is not equal to or greater than the target value α, the management server 250 proceeds to step S709, and judges whether the calculated ratio of femto base stations is equal to or smaller than (target value α−Δ1). When the calculated ratio of femto base stations is equal to or smaller than (target value α−Δ1), the management server 250 proceeds to step S711, and increments by (ΔdB) the offset of the downlink transmission power of the femto base stations within the same macro cell. When the calculated ratio of femto base stations is not equal to or smaller than (target value α−Δ1), the management server 250 maintains the current offset. That is, the offset of the downlink transmission power is controlled by a step of (ΔdB) so that the calculated ratio of femto base stations falls within a target range between the target value α and (target value α−Δ1). Note that the above-mentioned example illustrates the case where the offset of the downlink transmission power is increased and decreased by the same step width ΔdB. However, different step widths may be used.

In step S713, the management server 250 judges whether a setting timing for setting the parameter for the radio resource has been reached or not. Examples of the setting timing may include a predetermined timing at a predetermined date and time, a timing at which the reception level that satisfies conditions for calculating the first statistic is collected, and a timing at which interference to a macro mobile station reaches a level that causes a fault. At the setting timing, the management server 250 applies the offset currently held to all femto base stations within the same macro cell in step S715. In step S717, if the management server 250 manages a plurality of macro cells and when there is a macro cell that is not processed, the management server 250 returns to step S701 to repeat the processing. Accordingly, the first statistic in the third exemplary embodiment corresponds to the ratio of femto base stations from which the interference detection ratio exceeds the threshold within the macro cell, and the parameter for the radio resource corresponds to the offset of the downlink transmission power.

Modified Example of Third Exemplary Embodiment

Note that in the third exemplary embodiment, the offset is controlled by the ratio of femto base stations from which the interference detection ratio exceeds the predetermined value. However, an average value of interference detection ratios may be calculated instead of the ratio of femto base stations from which the interference detection ratio exceeds the predetermined value. Also in this case, as with the third exemplary embodiment, the offset of the downlink transmission power is controlled by a step of (ΔdB) so that the average value of the interference detection ratios falls within a target range between a target value and (target value−Δ1'). Note that also in this example, the offset of the downlink transmission power may be increased and decreased with different step widths. If there is no variation in specifications of each femto base station, the optimization can be satisfactorily realized using the average value of interference detection ratios. If there is no variation in specifications of each macro base station, the offset of the downlink transmission power may be set to each set of a plurality of macro base stations. In this case, parameters are commonly set in the femto base stations under the control of different macro base stations.

Fourth Exemplary Embodiment

A radio communication system according to a fourth exemplary embodiment of the present invention will be described with reference to FIG. 8. In the third exemplary embodiment, the offset of the downlink transmission power is determined based on the ratio of femto base stations from which the interference detection ratio exceeds the threshold within the macro cell. On the other hand, in this exemplary embodiment, a space propagation loss between a femto base station and a macro mobile station is set based on the ratio of femto base stations from which the interference detection ratio exceeds the threshold within the macro cell. The other configurations and operations are similar to those of the second exemplary embodiment, so the description thereof is herein omitted.

<Operations of Fourth Exemplary Embodiment for Statistic Calculation and Parameter Setting in Management Server>

Figure 8:
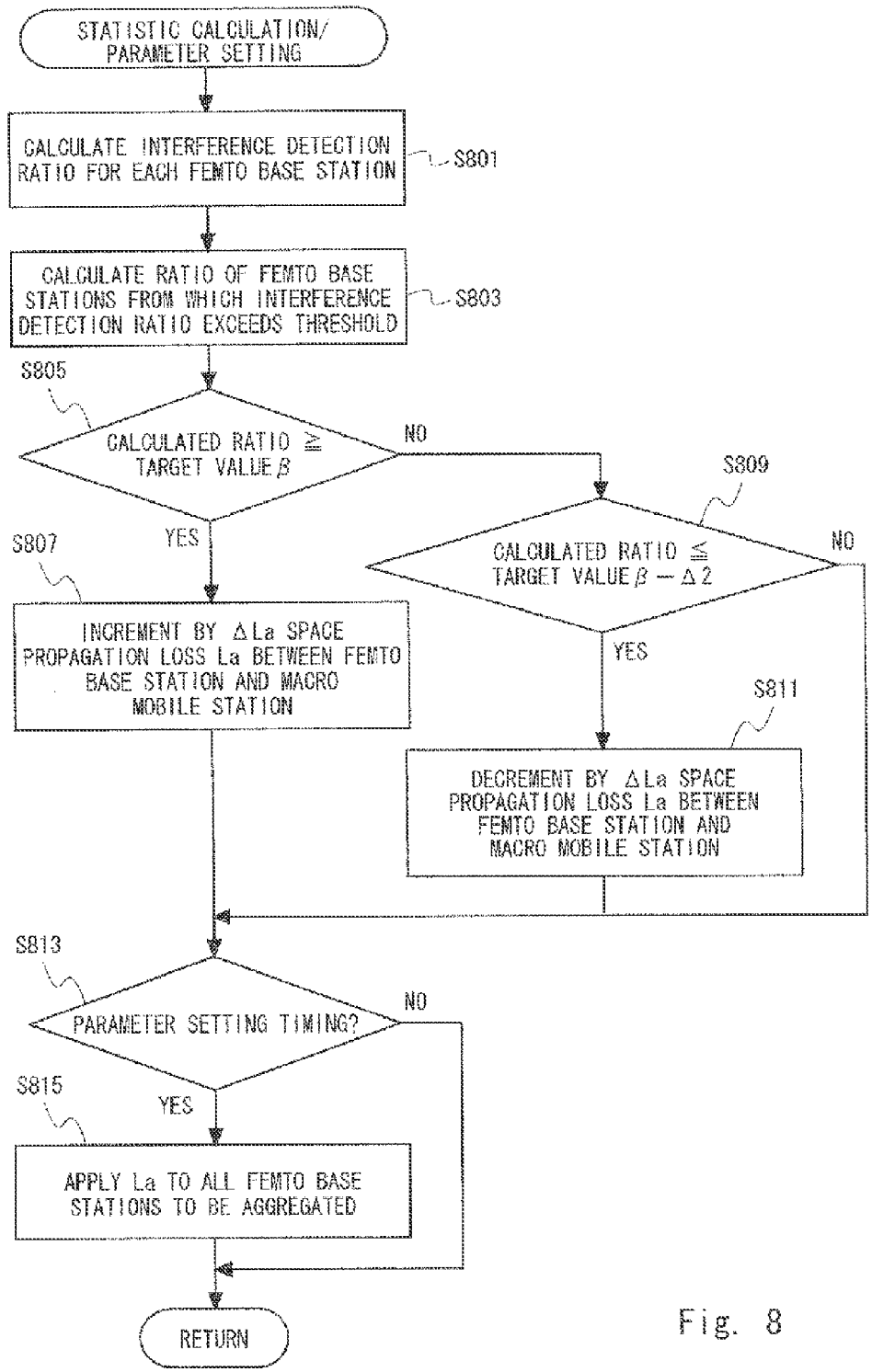
FIG. 8 is a flowchart showing a procedure in a management server according to a fourth exemplary embodiment of the present invention.

FIG. 8 shows a flowchart of an operation procedure of the fourth exemplary embodiment for statistic calculation and parameter setting in the management server. Note that a space propagation loss La between a femto base station and a macro mobile station is used in the case of obtaining a building penetration loss LE(dB)=(Ptx_f−Prx_f−La)/2 between the femto base station and the macro mobile station. Accordingly, an increase in downlink transmission power of the femto base station is optimized in consideration of the building penetration loss LE(dB). Note that in the above expression, (Ptx_f) represents an estimated transmission power of the macro mobile station, and (Prx_f) represents a measured value of uplink reception power in the femto base station.

First, in step S801, the management server 250 calculates the interference detection ratio for each femto base station within the same macro cell from the interference values measured and collected by the macro mobile stations. The interference detection and interference detection ratio can be achieved in the same manner as in the third exemplary embodiment. In step S803, the management server 250 calculates the ratio of femto base stations from which the interference detection ratio exceeds the threshold within the same macro cell. In step S805, the management server 250 judges whether the calculated ratio of the femto base stations is equal to or greater than a target value β. When the calculated ratio of the femto base stations is equal to or greater than the target value β, the management server 250 proceeds to step S807, and increments by (ΔLa) the space propagation loss La between each femto base station and each macro mobile station within the same macro cell. On the other hand, when the calculated ratio of the femto base stations is not equal to or greater than the target value β, the management server 250 proceeds to step S809, and judges whether the calculated ratio of the femto base stations is equal to or smaller than (target value β−Δ2). When the calculated ratio of the femto base stations is equal to or smaller than (target value β−Δ2), the management server 250 proceeds to step S811, and decrements by (ΔLa) the space propagation loss La between each femto base station and each macro mobile station within the same macro cell. When the calculated ratio of the femto base stations is not equal to or smaller than (target value β−Δ2), the management server 250 maintains the current space propagation loss La. That is, the space propagation loss La is controlled by a step of ΔLa so that the calculated ratio of the femto base stations falls within a target range between the target value β and (target value β−Δ2). Note that the above-mentioned example illustrates the case where the space propagation loss La is increased and decreased by the same step width ΔLa. However, different step widths may be used.

In step S813, the management server 250 judges whether a setting timing for setting the parameter for the radio resource has been reached or not. Examples of the setting timing may include a predetermined timing at a predetermined date and time, a timing at which the reception level that satisfies conditions for calculating the first statistic is collected, and a timing at which interference to a macro mobile station reaches a level that causes a fault. At the setting timing, the management server 250 applies, in step S815, the currently held space propagation loss La to the calculation of the building penetration loss LE(dB) within the same macro cell. Note that also the fourth exemplary embodiment may employ a configuration in which the same space propagation loss La is applied to a plurality of macro cells. Accordingly, the first statistic in the fourth exemplary embodiment corresponds to the ratio of femto base stations from which the interference detection ratio exceeds the threshold within the macro cell, and the parameter for the radio resource corresponds to the space propagation loss La.

Fifth Exemplary Embodiment

A radio communication system according to a fifth exemplary embodiment of the present invention will be described with reference to FIG. 9. In the third exemplary embodiment, the offset of the downlink transmission power is determined based on the ratio of femto base stations from which the interference detection ratio exceeds the threshold within the macro cell. On the other hand, in this exemplary embodiment, a reception quality target value within a femtocell is set based on the ratio of femto base stations from which the interference detection ratio exceeds the threshold within the macro cell. The reception quality target value within the femtocell is a parameter for setting the downlink transmission power of a femto base station and the uplink transmission power of a femto mobile station. The other configurations and operations are similar to those of the second exemplary embodiment, so the description thereof is herein omitted.

<Operations of Fifth Exemplary Embodiment for Statistic Calculation and Parameter Setting in Management Server>

Figure 9:
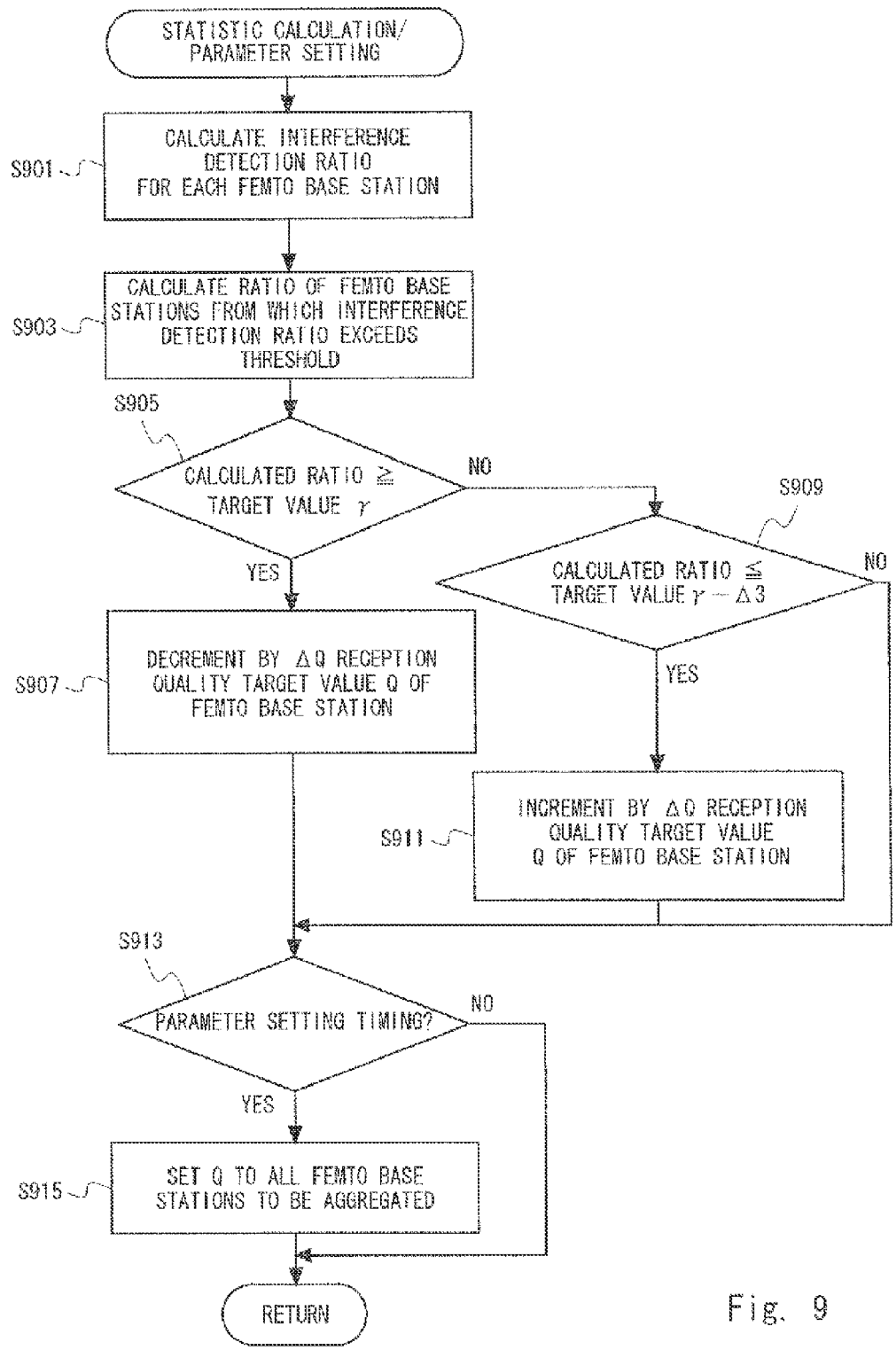
FIG. 9 is a flowchart showing a procedure in a management server according to a fifth exemplary embodiment of the present invention.

FIG. 9 shows a flowchart of an operation procedure of the fifth exemplary embodiment for statistic calculation and parameter setting in the management server.

First, in step S901, the management server 250 calculates the interference detection ratio of each femto base station within the same macro cell from the interference values measured and collected by the macro mobile stations. The interference detection and interference detection ratio can be achieved in the same manner as in the third exemplary embodiment. In step S903, the management server 250 calculates the ratio of femto base stations from which the interference detection ratio cell exceeds the threshold within the same macro. In step S905, the management server 250 judges whether the calculated ratio of femto base stations is equal to or greater than a target value γ. When the calculated ratio of femto base stations is equal to or greater than the target value γ, the management server 250 proceeds to step S907, and decrements by (ΔQ) a reception quality target value Q in the same macro cell. On the other hand, when the calculated ratio of femto base stations is not equal to or greater than the target value γ, the management server 250 proceeds to step S909, and judges whether the calculated ratio of femto base stations is equal to or smaller than (target value γ−Δ3). When the calculated ratio of femto base stations is equal to or smaller than (target value γ−Δ3), the management server 250 proceeds to step S911, and increments by (ΔQ) the reception quality target value Q in the same macro cell. When the calculated ratio of femto base stations is not equal to or smaller than (target value γ−Δ3), the management server 250 maintains the current reception quality target value Q. That is, the reception quality target value Q is controlled by a step of ΔQ so that the calculated ratio of the femto base stations falls within a target range between the target value γ and (target value γ−Δ3). Note that the above-mentioned example illustrates the case where the reception quality target value Q is increased and decreased by the same step width ΔQ. However, different step widths may be used.

In step S913, the management server 250 judges whether a setting timing for setting the parameter for the radio resource has been reached or not. Examples of the setting timing may include a predetermined timing at a predetermined date and time, a timing at which the reception level that satisfies conditions for calculating the first statistic is collected, and a timing at which interference to a macro mobile station reaches a level that causes a fault. At the setting timing, the management server 250 applies, in step S915, the current reception quality target value Q as the reception quality in each femtocell in the same macro cell. Note that also the fifth exemplary embodiment may employ a configuration in which the same reception quality is applied to a plurality of macro cells. Accordingly, the first statistic according to the fifth exemplary embodiment corresponds to the ratio of femto base stations from which the interference detection ratio exceeds the threshold within the macro cell, and the parameter for the radio resource corresponds to the reception quality target value Q.

Sixth Exemplary Embodiment

Figure 10:
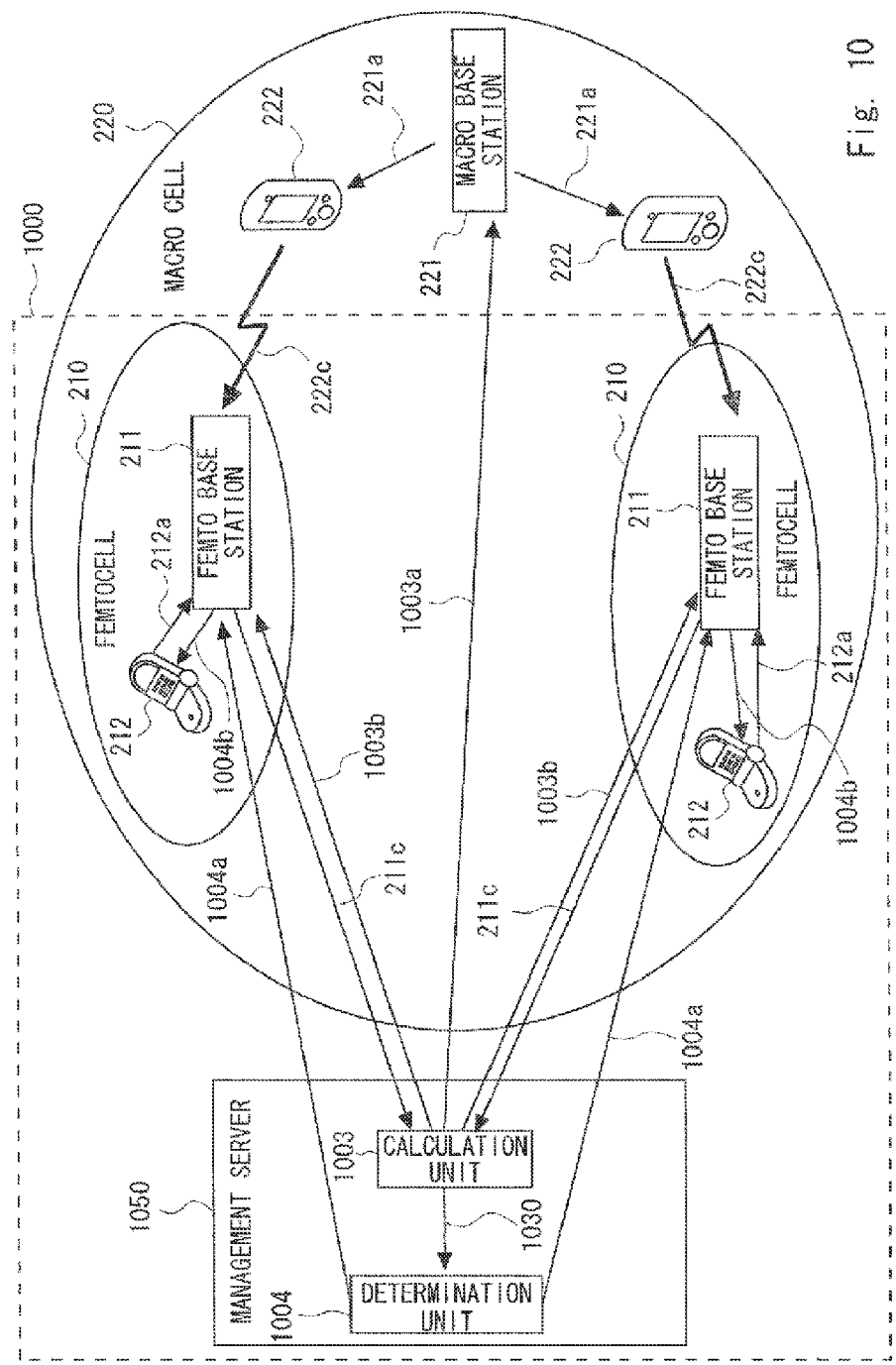
FIG. 10 is a diagram showing a configuration of a radio communication system according to a sixth exemplary embodiment of the present invention.

A radio communication system according to a sixth exemplary embodiment of the present invention will be described with reference to FIGS. 10 to 14. In this exemplary embodiment, a radio resource to be used by a plurality of femto mobile stations is determined based on a second statistic which is calculated by aggregating values from the femto base stations. Hereinafter, the term "second statistic" refers to a statistic obtained by aggregating reception levels at a plurality of femto base stations of radio waves from macro mobile stations. FIG. 10 illustrates, as a typical example, a second statistic 1030 obtained by aggregating interferences to the femto base stations 211 from the macro mobile stations 222 in the plurality of femtocells 210 within the macro cell 220. An example is described in which the uplink transmission power of a radio signal 212a of each of the plurality of femto mobile stations 212 is determined based on the second statistic 1030.

<Configuration and Operation of Radio Communication System According to Sixth Exemplary Embodiment>

FIG. 10 shows a configuration of a radio communication system 1000 according to the sixth exemplary embodiment which includes a plurality of femto base stations 211 and a plurality of femto mobile stations 212 connected to the plurality of femto base stations 211. The macro cell 220, which is larger than each femtocell 210 formed by each femto base station 211, includes the macro base station 221 and the macro mobile stations 222 that are connected to the macro base station 221. Each femto mobile station 212 within each femtocell 210 communicates with the corresponding femto base station 211 by the radio signal 212a having the determined uplink transmission power. Though FIG. 10 shows one macro cell 220, the number of macro cells is not limited thereto. A management server 1050 may calculate a statistic for each femtocell 210 within an area covering the plurality of macro cells 220, and may determine the radio resource for each femto mobile station 212.

The sixth exemplary embodiment illustrates an example in which a calculation unit 1003 and a determination unit 1004 are provided in the management server 1050 that manages the plurality of femtocells 210. However, the functions of the calculation unit 1003 and the determination unit 1004 may be disposed in other elements such as the macro base station 221, may be disposed in a distributed manner in the femto base stations 211, or may be disposed in other elements in the radio communication system 1000. As in the second to fifth exemplary embodiments, the calculation unit 1003 transmits a measurement instruction signal 1003a to the macro base station 221, to thereby request the macro base station 221 to instruct, by the measurement instruction signal 221a, the macro mobile station 222 to measure interference from the femto base station 211. The calculation unit 1003 judges that the measurement instruction to the macro mobile station 222 indicates a state in which interference to the neighboring femto base station 211 occurs. The calculation unit 1003 sends a measurement instruction signal 1003b to measure the interference from the macro mobile station 222 to the femto base station located in the vicinity of the macro mobile station 222 to which the measurement instruction is sent. The femto base station 211 measures the reception level at the femto base station 211 of a radio wave 222c from the macro mobile station 222. When there is interference, the level of which is equal to or greater than a predetermined level, due to the radio wave 222c from the macro mobile station 222, the femto base station 211 reports it to the management server 1050. The calculation unit 1003 calculates the second statistic 1030 obtained by aggregating, for each femto base station 211, the number of times of interference measurement instruction to the macro mobile station 222 and the interference reports from the femto base station 211. Based on the second statistic 1030, the determination unit 1004 determines the radio resource, such as the uplink transmission power, to be used by all femto mobile stations 212 within the macro cell 220. The uplink transmission power is determined by transmission data 1004a from the determination unit 1004 to the femto base station 211 and further by transmission data 1004b from the femto base station 211 to the femto mobile station 212.

Figure 11:
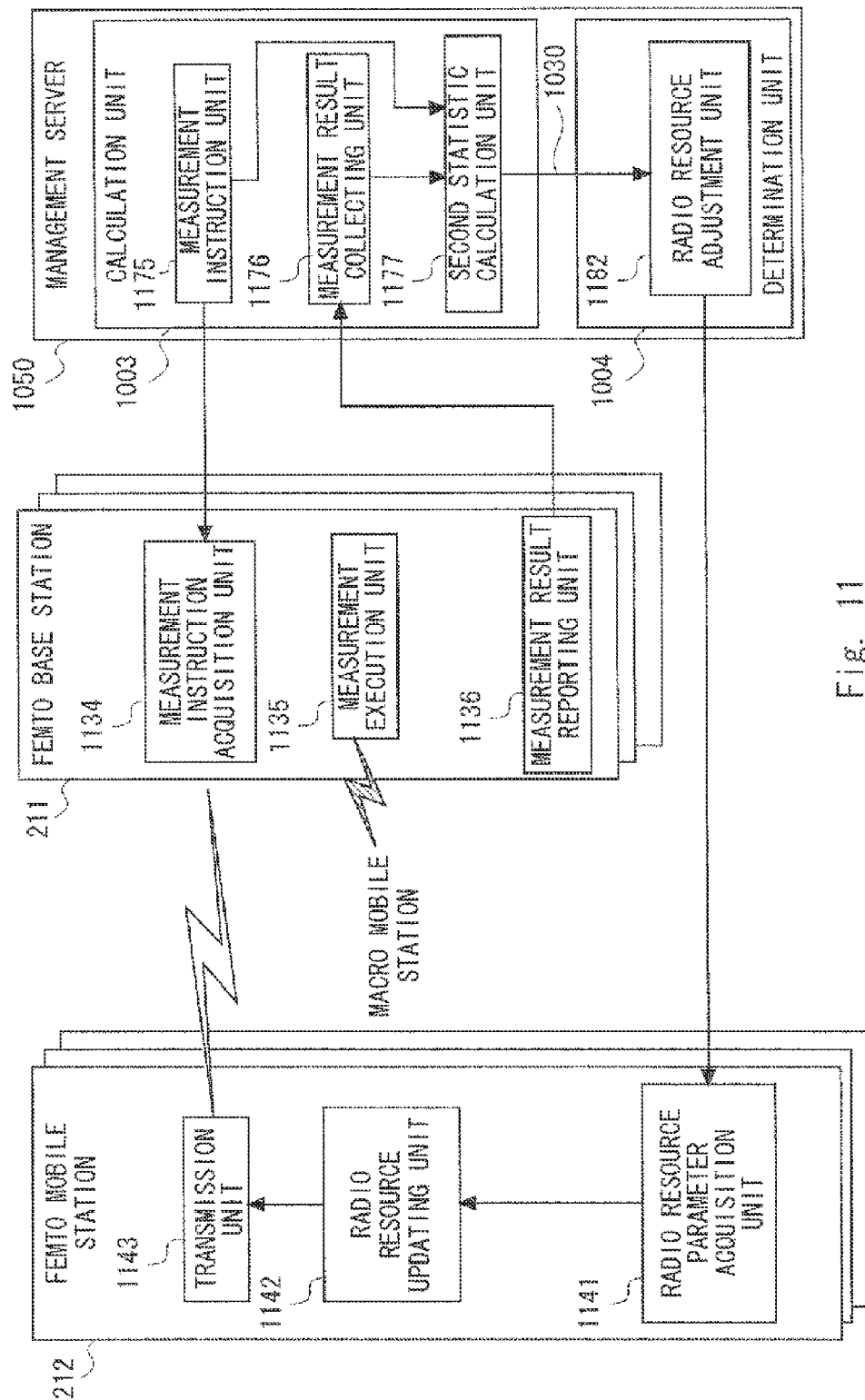
FIG. 11 is a block diagram showing the configuration of the radio communication system according to the sixth exemplary embodiment of the present invention.

FIG. 11 is a block diagram showing the configuration of each element in FIG. 10.

A measurement instruction unit 1175 of the management server 1050 instructs the macro mobile station 222 to measure the interference from the femto base station 211, and also instructs the femto base station 211 located in the vicinity of the macro mobile station 222, to which the measurement instruction is sent, to measure the interference from the macro mobile station 222. A measurement instruction acquisition unit 1134 of the femto base station 211 receives the measurement instruction, and a measurement execution unit 1135 measures as the reception level the interference from the neighboring macro mobile station 222. When the interference power from the macro mobile station 222 to the femto base station 211 is equal to or higher than the predetermined level, a measurement result reporting unit 1136 reports it to the management server 1050. Note that also even when the interference power is not equal to or higher than the predetermined level, the report may be issued.

A measurement result collecting unit 1176 of the management server 1050 collects the measurement results of the reception level from each femto base station 211, and transmits the measurement results to a second statistic calculation unit 1177. The second statistic calculation unit 1177 calculates the second statistic 1030 based on the number of times of the measurement instruction by the measurement instruction unit 1175 and the number of times of the reported interference detection for each femto base station, and transmits the second statistic 1030 to a radio resource adjustment unit 1182 in the determination unit 1004. The radio resource adjustment unit 1182 determines a parameter for adjusting the radio resource for each femto mobile station 212 by using the second statistic 1030, and sets the parameter to each femto mobile station 212 connected to all the femto base stations 211 to be aggregated.

In each of the femto mobile stations 212 connected to the femto base stations 211 to be aggregated, a radio resource parameter acquisition unit 1141 acquires a radio resource/parameter common within the macro cell 220 from the management server 1050. A radio resource updating unit 1142 updates the acquired radio resource. A transmission unit 1143 performs transmission with the updated radio resource, that is, the uplink transmission power in this example, to the femto base station 211.

Figure 12:
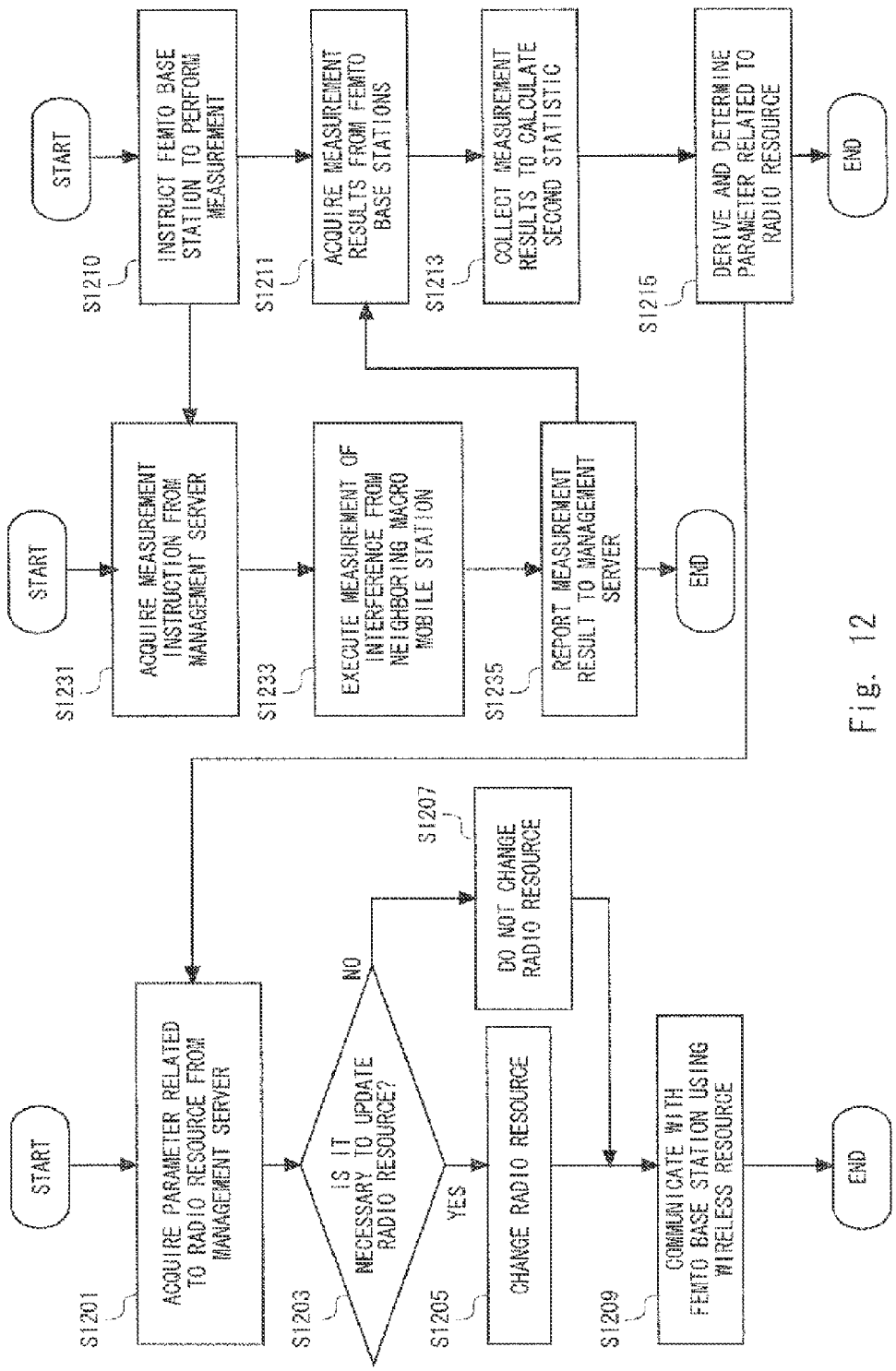
FIG. 12 is a flowchart showing a procedure in the radio communication system according to the sixth exemplary embodiment of the present invention.

FIG. 12 shows a flowchart of an operation procedure in each element of the sixth exemplary embodiment.

In step S1210, the management server 1050 instructs each macro mobile station 222 to measure interference and instructs the corresponding femto base station 211 to measure interference. Upon acquiring the measurement instruction from the management server 1050 in step S1231, the femto base station 211 measures as the reception level the interference from the neighboring macro mobile station 222 in step S1233. Then, in step S1235, each femto base station 211 reports the reception level as the measurement result to the management server 1050.

In step S1211, the management server 1050 acquires the measurement results from the femto base stations 211. In step S1213, the management server 1050 calculates the second statistic 1030 based on the number of times of interference measurement instruction to each macro mobile station 222 (this number of times corresponds to the number of times of measurement instruction to each femto base station 211) and on the measurement results collected from each femto base station 211. In step S1215, the management server 1050 derives a parameter related to the radio resource based on the calculated second statistic 1030, and sets the parameter to each femto mobile station 212 connected to all the femto base stations 211 to be aggregated. Note that the setting of the parameter related to the radio resource to each femto mobile station 212 may be performed on the individual femto mobile stations 212. Alternatively, the setting may be performed on all the femto base stations 212 within the femtocells 210 by the corresponding femto base station 211, or may be performed simultaneously by the macro base station 221 for each macro cell 220.

Upon acquiring the parameter related to the radio resource common in the macro cell 220 in step S1201, each femto mobile station 212 determines whether it is necessary to update the radio resource in step S1203. If it is necessary to update the radio resource, each femto mobile station 212 changes the radio resource in step S1205. On the other hand, if it is not necessary to update the radio resource, each femto mobile station 212 maintains the radio resource without changing it in step S1207. In step S1209, each femto mobile station 212 communicates with the femto base station 211 by using the current radio resource. Here, all the femto mobile stations 212 perform transmission using the determined uplink transmission power.

<Configuration of Management Server 1050 According to Sixth Exemplary Embodiment>

Figure 13:
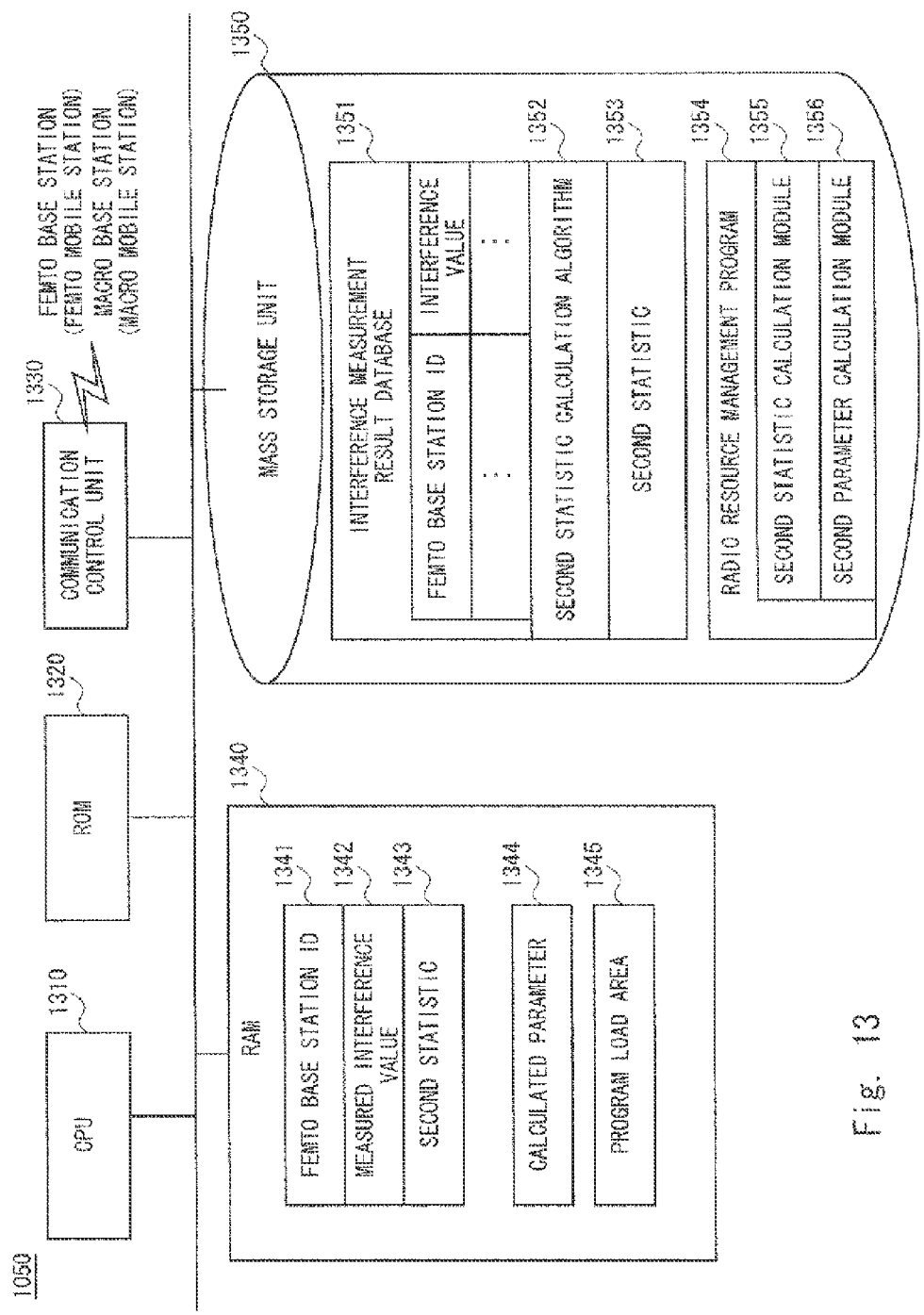
FIG. 13 is a block diagram showing a configuration of a management server according to the sixth exemplary embodiment of the present invention.

FIG. 13 is a block diagram showing the configuration of the management server 1050 according to the sixth exemplary embodiment.

Referring to FIG. 13, a CPU 1310 is a processor for arithmetic control, and executes programs to implement each unit of the management server 1050 illustrated in FIG. 10. A ROM 1320 stores fixed data and programs such as initial data and program. A communication control unit 1330 communicates with the femto base stations 211, the femto mobile stations 212, the macro base station 221, and the macro mobile stations 222 via a network.

A RAM 1340 is used by the CPU 1310 as a work area for temporary storage. In the RAM 1340, areas for storing the following data necessary to implement this exemplary embodiment are reserved. An area 1341 stores the femto base station ID for identifying each femto base station 211 which has measured the acquired reception level. An area 1342 stores the measured interference value (reception level) measured by the femto base station 211 having the femto base station ID. An area 1343 stores the second statistic 1030 collected and calculated by the management server 1050. An area 1344 stores the calculated parameter of the radio resource calculated based on the second statistic 1030. A program load area 1345 is a storage area for loading a program to be executed by the CPU 1310, as with the above-mentioned exemplary embodiment.

Figure 14:
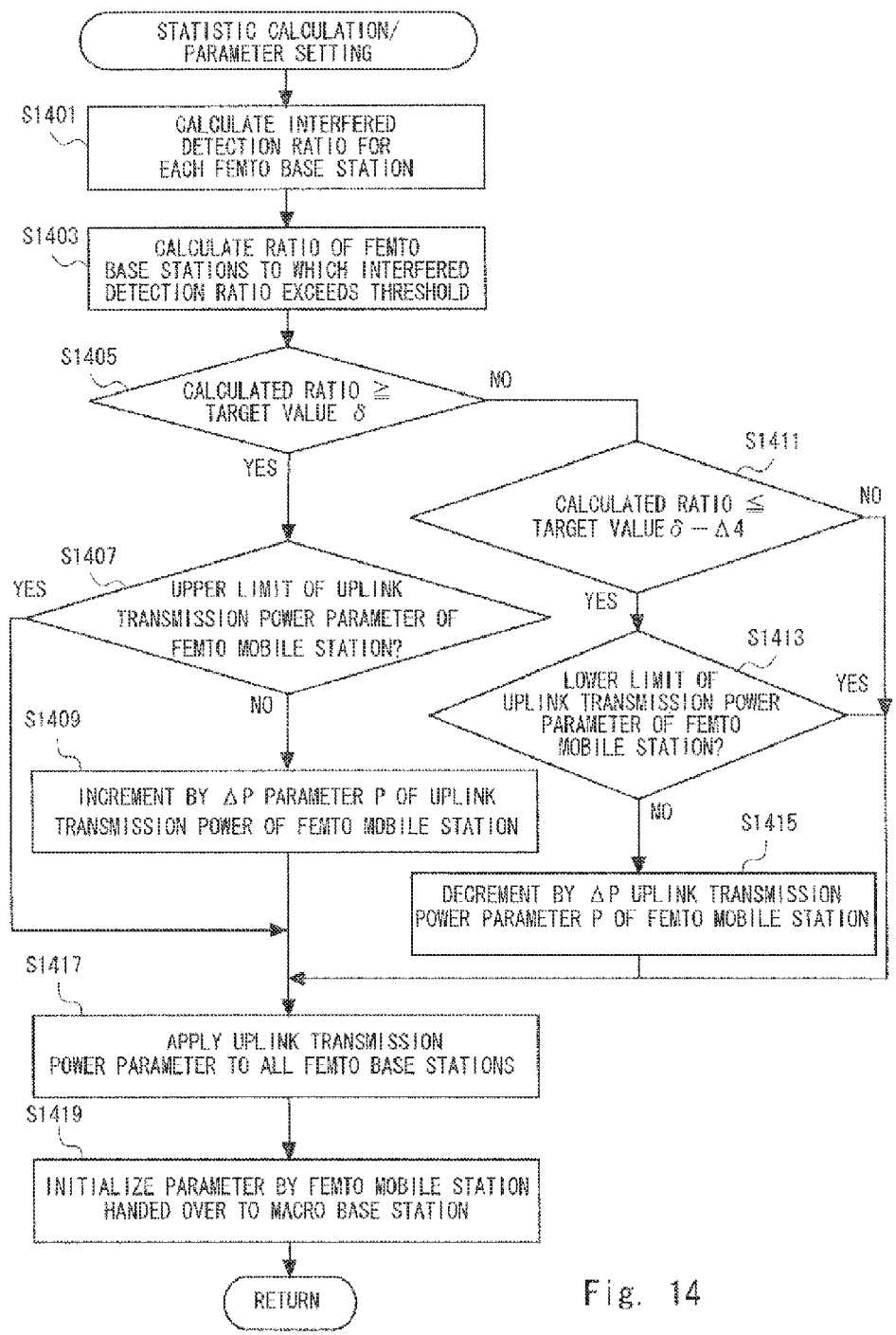
FIG. 14 is a flowchart showing a procedure in the management server according to the sixth exemplary embodiment of the present invention.

A mass storage unit 1350 such as a disk stores, in a non-volatile manner, data such as the measurement results collected from the macro mobile stations 222 and application programs to be executed by the CPU 1310. The mass storage unit 1350 stores the following data or programs necessary to implement this exemplary embodiment. A interference measurement result collection database 1351 stores interference values (reception levels) as the measurement results collected from each femto base station 211, in a manner linked to the femto base station ID. A second statistic calculation algorithm 1352 stores an algorithm for obtaining the second statistic from the collected interference values. A second statistic 1353 stores the second statistic 1030 calculated by the second statistic calculation algorithm 1352. In the case of managing the femtocells 210 in a plurality of macro cells 220, a plurality of second statistics 1030 is stored so as to correspond to the respective macro cells 220. Next, as a program, a radio resource management program 1354 for causing the overall processing to be executed is stored. As shown in FIG. 14 described below, a second statistic calculation module 1355 is a module that calculates the second statistic 1030 according to the second statistic calculation algorithm 1352. A second parameter calculation module 1356 is a module that calculates the second parameter of the radio resource determined for all the femto mobile stations 212 based on the second statistic 1030 as shown in FIG. 14 described below.

<Operations of Sixth Exemplary Embodiment for Statistic Calculation and Parameter Setting in Management Server>

FIG. 14 shows a flowchart of an operation procedure of the sixth exemplary embodiment for statistic calculation and parameter setting in the management server. In the sixth exemplary embodiment, the parameter for the uplink transmission power of the femto mobile station is controlled by the interference detection ratio indicating a detection ratio of interference to each femto base station. Note that as the parameter, there is selected a transmission power parameter for determining the uplink transmission power of the femto mobile station compliant with 3GPP TS 36.213 (3rd Generation Partnership Project; Technical Specification Group Radio Access Network; Evolved Universal Terrestrial Radio Access (E-UTRA); Physical layer procedures (Release 9)). For example, transmission power of an uplink shared channel is determined by the following expression.

$$PPUSCH(i)=\min\{PCMAX, 10 \log 10(MPUSCH(i))+ P0\_PUSCH(j)+\alpha(J)\cdot PL+\Delta TF(TF(i))+f(i)\}$$

where

PCMAX is a maximum transmission power of a mobile station UE (User Equipment);

MPUSCH is the number of resource blocks in a physical uplink shared channel;

PO_PUSCH is a parameter related to power control, which is notified from a radio base station eNB (evolved Node B);

$\alpha(j)$ is a parameter designated by the radio base station eNB;

PL is a propagation loss (path loss);

$\Delta TF$ is an offset value determined for each transmission format;

TF is an index of each transmission format;

f(i) is an offset value for adjustment;

i is an index indicating a sub-frame number; and j is a flag indicating whether dynamic scheduling is applied or persistent scheduling is applied.

In particular, PO_PUSCH, $\alpha(j)$, $\Delta TF$, and f(i) are parameters for the uplink transmission power of each femto mobile station. Note that the above-described parameter PO_PUSCH related to the power control notified from the radio base station eNB is configured of a value commonly used in mobile stations within a cell and a value used for each mobile station UE.

In step S1401, the management server 1050 calculates an uplink interfered detection ratio which indicates a detection ratio of uplink interference to each femto base station within the same base station, based on the interference values measured and collected by each femto base station. The uplink interfered detection ratio is calculated for each femto base station as the uplink interfered detection ratio=(the number of reports that interference to each femto base station is detected/the number of macro mobile stations instructed by the management server to detect interference from each femto base station). In other words, the management server 1050 determines a time point when the macro mobile station 222 approaches the femtocell 210 and is likely to receive interference from the femto base station 211, as a situation in which the femto base station 211 is also likely to receive interference from the macro mobile station 222. Accordingly, the number of times of instructing, by the management server 1050, the macro mobile station 222 to measure the interference from the femto base station 211 is the denominator of the uplink interfered detection ratio, as the total number of times of reaching the situation in which the femto base station 211 is likely to receive the interference from the macro mobile station 222. The number of times of reports indicating that the femto base station 211 has received interference at the predetermined level or higher from the macro mobile station 222 is the denomination of the uplink interfered detection ratio. Examples of the interference detection described above include reception levels at each femto base station, and a case where the conditions in which the description of the interference detection ratio in the third exemplary embodiment is applied are satisfied, for example.

In step S1403, the management server 1050 calculates the ratio of femto base stations to which the interfered detection ratio exceeds the threshold within the same macro cell. In step S1405, the management server 1050 judges whether or not the calculated ratio of femto base stations is equal to or greater than a target value δ. When the calculated ratio of femto base stations is equal to or greater than the target value δ, the management server 1050 proceeds to step S1407, and judges whether the uplink transmission power of the femto mobile station is an upper limit or not. If the transmission power is the upper limit, the management server 1050 maintains the current parameter value. This is for the purpose of restricting the uplink transmission power of the femto mobile station to prevent the uplink transmission power from affecting the communication power of the macro mobile station. When the uplink transmission power is not the upper limit, the management server 1050 proceeds to step S1409 and increments a parameter P by (ΔP). Here, an increase in the uplink transmission power is symbolically represented by (ΔP), but is a value that varies depending on the selected parameter. On the other hand, when the ratio of femto base stations calculated in step S1405 is not equal to or greater than the target value δ, the management server 1050 proceeds to step S1411, and judges whether the calculated ratio of femto base stations is equal to or smaller than (target value δ−Δ4). When the calculated ratio of femto base stations is equal to or smaller than (target value δ−Δ4), the management server 1050 proceeds to step S1413, and determines whether the uplink transmission power of the femto mobile station is a lower limit. When the uplink transmission power is the lower limit, the management server 1050 maintains the current parameter value. This is for the purpose of preventing the uplink transmission power of the femto mobile station from being brought into the state in which the communication quality cannot be maintained. When the uplink transmission power is not the upper limit, the management server 1050 proceeds to step S1415, and decrements the parameter P by (ΔP). In other words, the parameter for the uplink transmission power is controlled by a step of (ΔP) so that the uplink transmission power falls within the range between the upper limit and the lower limit and the calculated ratio of femto base stations falls within a target range between the target value δ and (target value δ−Δ4). Note that the above-mentioned example illustrates the case where the parameter for the uplink transmission power is increased and decreased by the same step width ΔP. However, different step widths may be used.

In step S1417, the management server 1050 applies the uplink transmission power which is currently held in all femto mobile stations within the same macro cell. Step S1419 is processing for initializing the parameter when the target femto mobile station is handed over to the macro cell (macro base station). If the target femto mobile station is not handed over, step S1419 is skipped. Accordingly, the second statistic according to the sixth exemplary embodiment corresponds to the ratio of femto base stations to which the uplink interfered detection ratio exceeds the threshold within the macro cell, and the parameter for the radio resource corresponds to the parameter for the uplink transmission power of each femto mobile station.

Note that this exemplary embodiment in which the uplink transmission power of the femto mobile station 212 is determined so as to exceed the interference from the macro mobile station 222 may cause interference to the macro mobile station 222 to the contrary. The above-mentioned upper limit is set to avoid such a situation. On the other hand, the lower limit is set to ensure the communication quality of the uplink transmission within each femtocell 210.

Seventh Exemplary Embodiment

A radio communication system according to a seventh exemplary embodiment of the present invention will be described with reference to FIGS. 15 to 19. In this exemplary embodiment, a radio resource to be used by a plurality of femto base stations is determined based on the first statistic and a third statistic in consideration of trade-off between interference power of each femto base station and interference power of the macro mobile station. In the following description, the term "third statistic" refers to a statistic obtained by aggregating reception levels at femto mobile stations of radio waves from a plurality of femto base stations.

Here, the first statistic is related to the interference from each femto base station to each macro mobile station, and the third statistic is related to the transmission power of each femto base station to each femto mobile station.

<Configuration and Operation of Radio Communication System According to Seventh Exemplary Embodiment>

Figure 15:
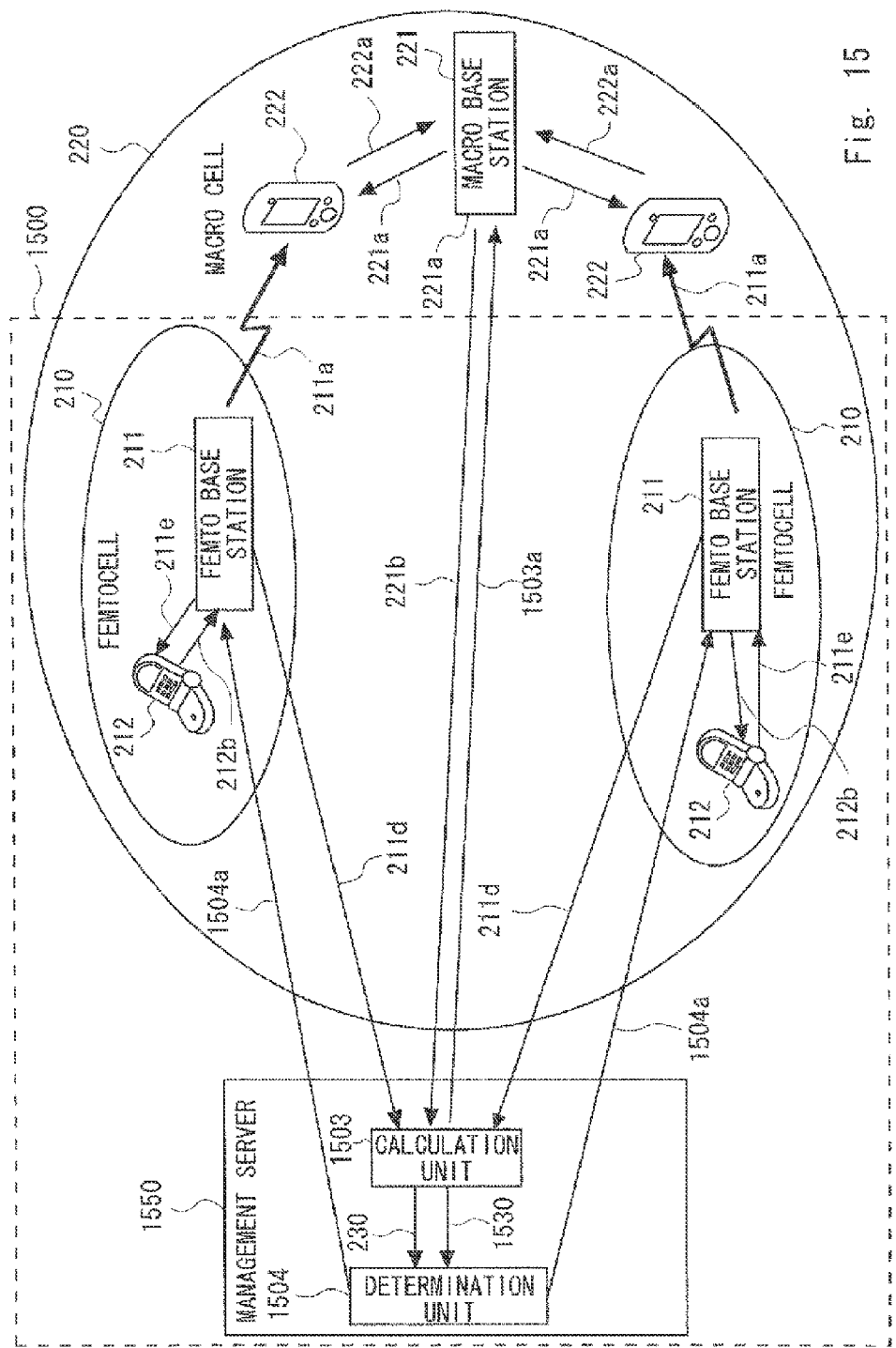
FIG. 15 is a diagram showing a configuration of a radio communication system according to a seventh exemplary embodiment of the present invention.

FIG. 15 shows a configuration of a radio communication system 1500 according to the seventh exemplary embodiment. FIG. 15 illustrates, as a typical example, an example in which the downlink transmission power of the plurality of femto base stations 211 is determined by the first statistic 230 and a third statistic 1530 in the plurality of femtocells 210 within the macro cell 220. The radio communication system 1500 includes a plurality of femto base stations 211 and a plurality of femto mobile stations 212 respectively connected to the plurality of femto base stations 211. The macro cell 220, which is larger than each femtocell 210 formed by each femto base station 211, includes the macro base station 221 and the macro mobile stations 222 that are connected to the macro base station 221. Each femto base station 211 within each femtocell 210 conducts communication using a radio signal 211e having the determined downlink transmission power. Though FIG. 15 shows one macro cell 220, the present invention is not limited thereto. A management server 1550 may calculate the statistic for each femtocell 210 within an area covering a plurality of macro cells 220, and may determine the radio resource of each femto base station 211.

A calculation unit 1503 calculates the first statistic 230 obtained by aggregating the reception levels 222a at the macro mobile stations 222 of the radio waves 211a from the plurality of femto base stations 211. Here, the calculation unit 1503 transmits a measurement instruction signal 1503a to the macro base station 221, to thereby request the macro base station 221 to instruct the macro mobile station 222 to perform measurement. The reception levels 222*a* are reported as the transmission data 221*b* from the respective macro mobile stations 222 to the management server 1550 via the macro base station 221 in response to each measurement instruction signal 221*a* from the macro base station 221. In FIG. 15, the illustration of the case of direct transmission from each macro mobile station 222 to the management server 1550 is omitted. The calculation unit 1503 calculates the third statistic 1530 by aggregating indoor dead zone ratios 211*d* collected from the plurality of femto base stations 211. Each indoor dead zone ratio 211*d* is transmitted from each femto base station 211 to the calculation unit 1503 according to an instruction from the management server 1550 at the timing when the macro mobile station 222 approaches the femtocell 210 to instruct the interference from the femto base station 211. This exemplary embodiment is not limited thereto, and a report may be periodically or non-periodically sent from each femto base station 211. Here, each indoor dead zone ratio 211*d* is calculated based on the cumulative probability distribution (CDF) of each reference signal reception quality (hereinafter "RSRQ") 212*b* which is collected from the plurality of femto mobile stations 212 within the femtocells 210 by the respective femto base stations 211. The indoor dead zone ratio 211*d* herein described is, for example, a ratio at which the CDF of the RSRQs in the femtocells 210 measured by the respective femto mobile stations 212 is equal to or smaller than a predetermined value. A determination unit 1504 determines a radio resource 1504*a*, such as downlink transmission power, to be used by the plurality of femto base stations 211, in consideration of trade-off between mutual interferences, based on the first statistic 230 and the third statistic 1530.

Figure 16:
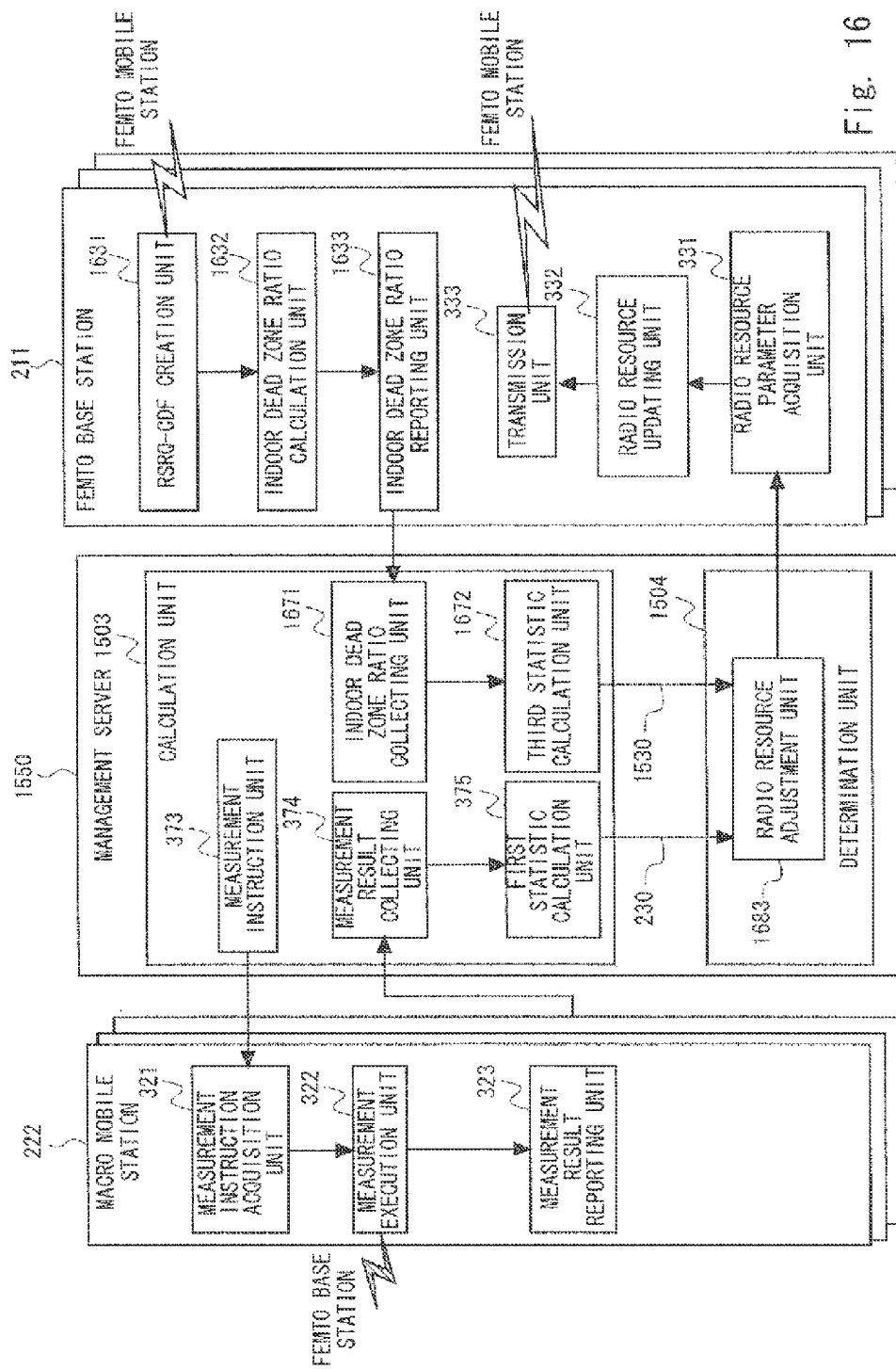
FIG. 16 is a block diagram showing the configuration of the radio communication system according to the seventh exemplary embodiment of the present invention.

FIG. 16 is a block diagram showing the configuration of each element shown in FIG. 15. Note that in FIG. 16, the illustration of the report on the measurement result of the reception level via the macro base station 221 is omitted.

The measurement instruction unit 373 included in the calculation unit 1503 of the management server 1550 transmits a measurement instruction to the macro mobile station 222 located in the vicinity of each femtocell within the macro cell (via the macro base station 221). In each macro mobile station 222, the measurement instruction acquisition unit 321 receives the measurement instruction from the measurement instruction unit 373, and the measurement execution unit 322 measures as the reception level the interference from the neighboring femto base station 211. The measurement result reporting unit 323 reports the measured reception level to the management server 1550 (via the macro base station 221). The measurement result collecting unit 374 of the management server 1550 collects the measurement results of the reception level from each macro mobile station 222, and transmits the measurement results to the first statistic calculation unit 375. The first statistic calculation unit 375 calculates the first statistic 230 and transmits it to a radio resource adjustment unit 1683 in the determination unit 1504.

On the other hand, in the femto base station 211, a RSRQ-CDF creation unit 1631 creates the CDF by collecting the RSRQs from the femto mobile stations 212. Next, an indoor dead zone ratio calculation unit 1632 calculates the indoor dead zone ratio, and an indoor dead zone ratio reporting unit 1633 reports the indoor dead zone ratio to the management server 1550. An indoor dead zone ratio collecting unit 1671 of the management server 1550 collects the indoor dead zone ratios from the femto base stations 211 and transmits indoor dead zone ratios to a third statistic calculation unit 1672. The third statistic calculation unit 1672 calculates the third statistic 1530 and transmits the third statistic to the radio resource adjustment unit 1683 in the determination unit 1504.

The radio resource adjustment unit 1683 of the management server 1550 determines a parameter for adjusting the radio resource of each femto base station 211 by using the first statistic 230 and the third statistic 1530. The parameter is set to all the femto base stations 211 to be aggregated. Thus, the trade-off between the interference power of each femto base station 211 and the interference power of each macro mobile station 222 is taken into consideration.

In each of the femto base stations 211 to be aggregated, the radio resource parameter acquisition unit 331 acquires a radio resource/parameter common within the macro cell 220 from the radio resource adjustment unit 1683, and the radio resource updating unit 332 updates the acquired radio resource. The transmission unit 333 transmits the updated radio resource, that is, the downlink transmission power in this example, to the femto base station 211.

Figure 17:
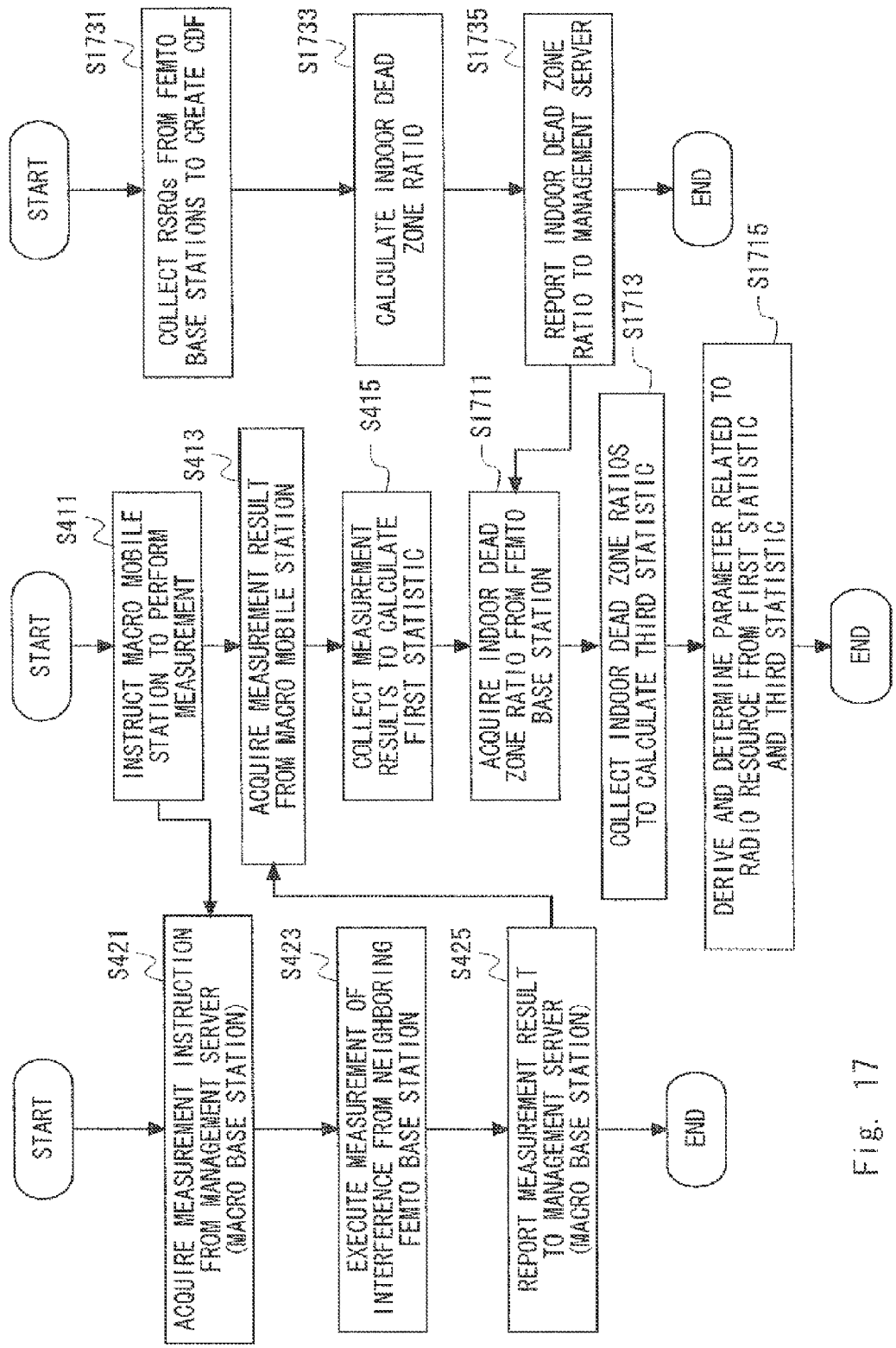
FIG. 17 is a flowchart showing a procedure in the radio communication system according to the seventh exemplary embodiment of the present invention.

FIG. 17 shows a flowchart of an operation procedure for each element of the seventh exemplary embodiment.

In step S411, the management server 1550 instructs each macro mobile station 222 to perform measurement. Upon acquiring the measurement instruction from the management server 1550 (via the macro base station 221) in step S421, each macro mobile station 222 measures as the reception level the interface from the neighboring femto base station 211 in step S423. In step S425, each macro mobile station 222 reports the reception level as the measurement result to the management server 1550 (via the macro base station 221). The management server 1550 acquires the measurement results from the macro mobile stations 222 in step S413, and calculates the first statistic 230 by collecting the measurement results from the macro mobile stations 222 in step S415.

On the other hand, each femto base station 211 creates the CFD from the RSRQs collected from the femto mobile stations 212 in step S1731. Next, each femto base station 211 calculates the indoor dead zone ratio from the CDF of the RSRQs collected in step S1733. In step S1735, each femto base station 211 reports the calculated indoor dead zone ratio to the management server 1550. The management server 1550 acquires the indoor dead zone ratio from each femto base station 211 in step S1711. In step S1713, the management server 1550 calculates the third statistic 1530 by collecting the indoor dead zone ratios. In step S1715, the management server 1550 derives a parameter related to the radio resource from the first statistic 230 and the third statistic 1530 and sets the parameter to each femto base station 211. The setting procedure in each femto base station 211 is illustrated in FIG. 4 and the like, so the illustration thereof is omitted in FIG. 17. Note that the setting of the parameter related to the radio resource to each femto base station 211 may be performed on the individual femto base stations 211. Alternatively, the setting may be performed simultaneously for each macro cell 220 or for a plurality of macro cells 220.

<Configuration of Management Server 1550 According to Seventh Exemplary Embodiment>

Figure 18A:
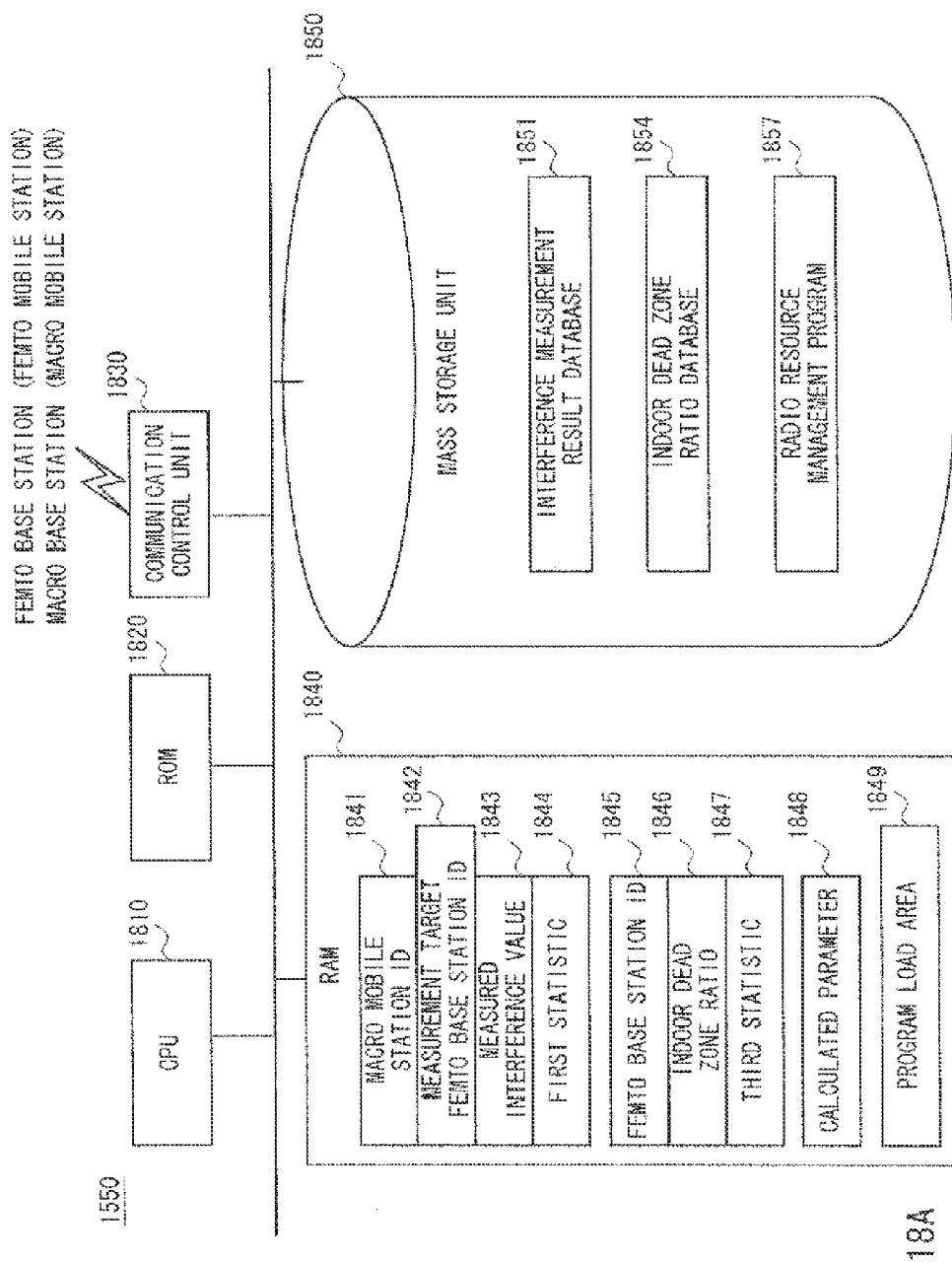
FIG. 18A is a block diagram showing a configuration of a management server according to the seventh exemplary embodiment of the present invention.
Figure 18B:
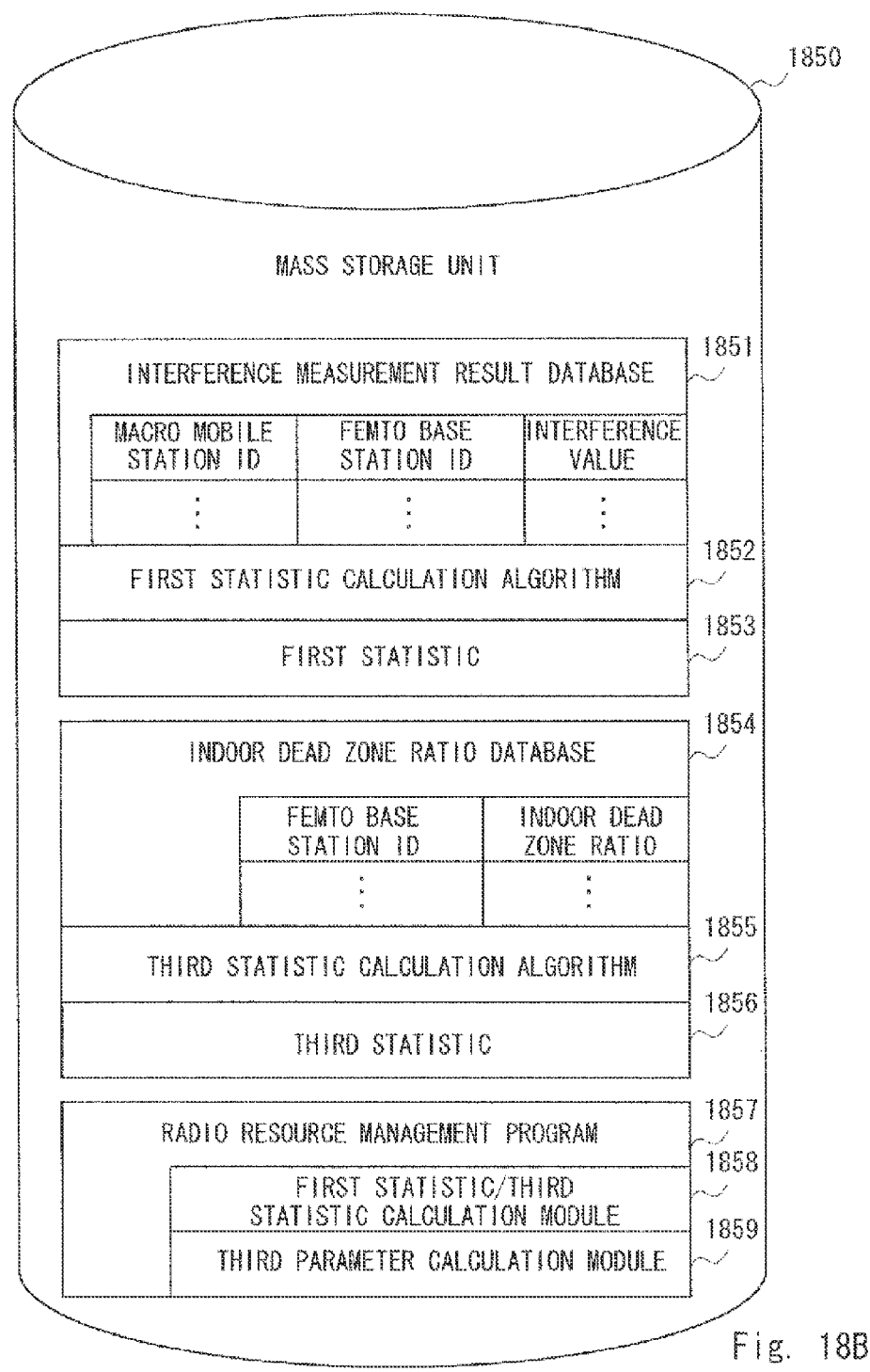
FIG. 18B is a diagram showing details of a mass storage unit according to the seventh exemplary embodiment of the present invention.

FIGS. 18A and 18B are block diagrams each showing the configuration of the management server 1550 according to the seventh exemplary embodiment.

Referring to FIG. 18A, a CPU 1810 is a processor for arithmetic control, and executes programs to implement each unit of the management server 1550 shown in FIG. 15. A ROM 1820 stores fixed data and programs such as initial data and program. A communication control unit 1830 communicates with the femto base stations 211, the femto mobile stations 212, the macro base station 221, and the macro mobile stations 222 via a network.

A RAM 1840 is used by the CPU 1810 as a work area for temporary storage. In the RAM 1840, areas for storing the following data necessary to implement this exemplary embodiment are reserved. An area 1841 stores a macro mobile station ID for identifying each macro mobile station 222 which has measured the acquired reception level. An area 1842 stores a measurement target femto base station ID for identifying each femto base station 211 that controls the femtocell 210 in the vicinity of which the macro mobile station 222 having the macro mobile station ID is located. An area 1843 stores the measured interference value (reception level) measured by the macro mobile station 222 having the macro mobile station ID. An area 1844 stores the first statistic 230 collected and calculated by the management server 1550. An area 1845 stores the femto base station ID for identifying each femto base station 211 that calculates the acquired indoor dead zone ratio. An area 1846 stores the indoor dead zone ration calculated by the femto base station 211 having the femto base station ID. An area 1847 stores the third statistic 1530 which is collected and calculated by the management server 1550. An area 1848 stores the calculated parameter of the radio resource calculated based on the first statistic 230 and the third statistic 1530. A program load area 1849 is a storage area to load a program to be executed by the CPU 1810, as with the above-mentioned exemplary embodiments.

Figure 19:
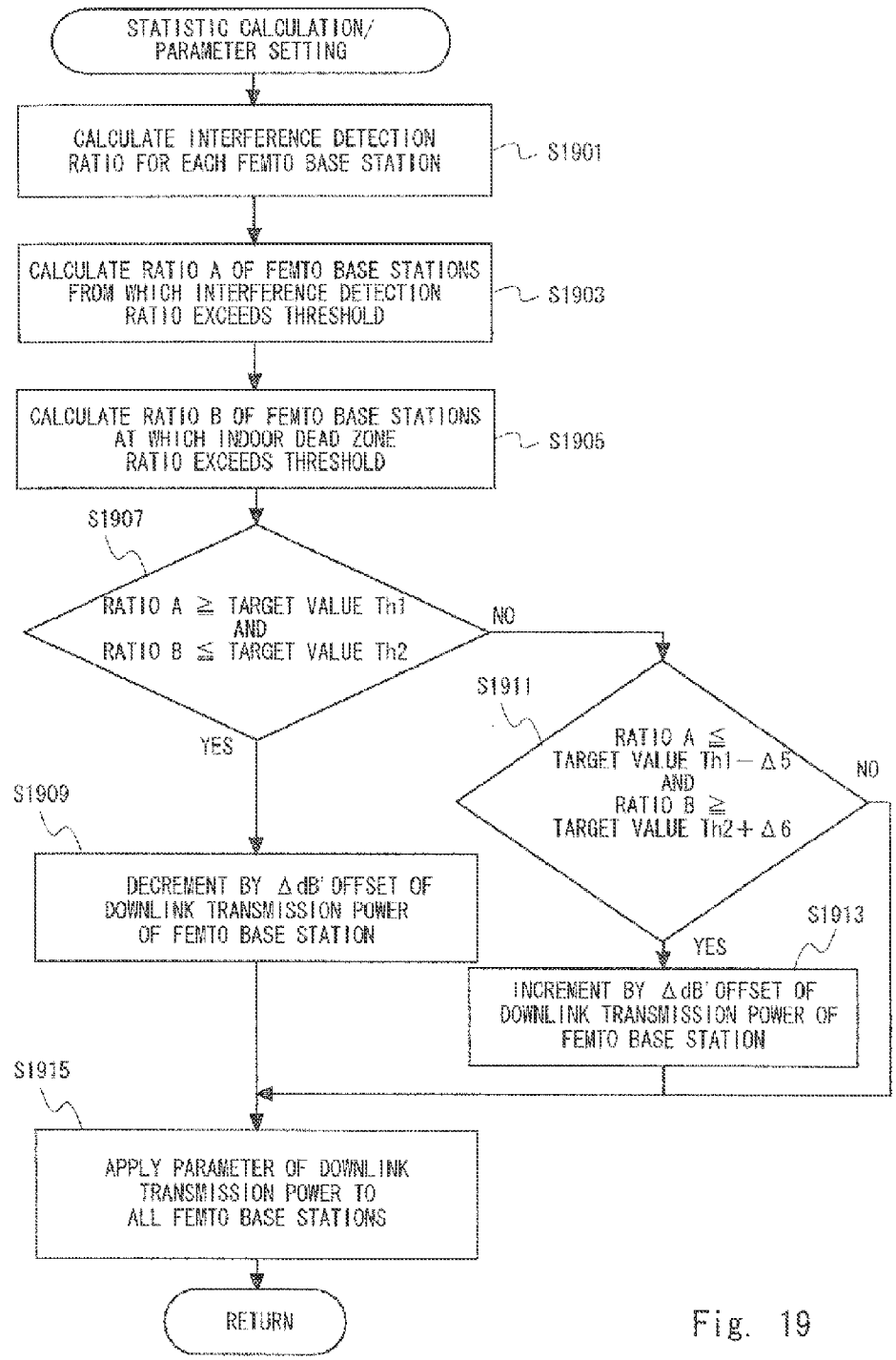
FIG. 19 is a flowchart showing a procedure in the management server according to the seventh exemplary embodiment of the present invention.

As shown in FIG. 18B, a mass storage unit 1850 stores, in a non-volatile manner, data such as the measurement results collected from the macro mobile stations 222 and application programs to be executed by the CPU 1810. The mass storage unit 1850 sores the following data or programs necessary to implement this exemplary embodiment. A measurement result collection database 1851 stores the interference values (reception levels) as the measurement results collected from the macro mobile stations 222, in a manner linked to the macro mobile station ID and the femto base station ID. A first statistic calculation algorithm 1852 stores an algorithm for obtaining the first statistic 230 from the collected interference values. A first statistic 1853 stores the first statistic 230 calculated by the first statistic calculation algorithm 1852. An indoor dead zone ratio database 1854 stores the indoor dead zone ratios, which are operation results collected from each femto base station 211, in a manner linked to the femto base station ID. A third statistic calculation algorithm 1855 stores an algorithm for obtaining the third statistic 1530 from the collected indoor dead zone ratios. A third statistic 1856 stores the third statistic 1530 calculated by the third statistic calculation algorithm 1855. Next, a radio resource management program 1857 for causing the overall processing to be executed is stored as a program. A first statistic/third statistic calculation module 1858 is a module that calculates the first statistic 230 and third statistic 1530 according to the first statistic calculation algorithm 1852 and the third statistic calculation algorithm 1855 as shown in FIG. 19 described below. A third parameter calculation module 1859 is a module that calculates a third parameter of the radio resource set to all the femto mobile stations based on the first statistic 230 and third statistic 1530 as shown in FIG. 19 described below.

<Operations of Seventh Exemplary Embodiment for Statistic Calculation and Parameter Setting in Management Server>

FIG. 19 shows a flowchart of an operation procedure of the seventh exemplary embodiment for statistic calculation and parameter setting in the management server. In the seventh exemplary embodiment, an offset of downlink transmission power of each femto base station is controlled by an interference detection ratio from each femto base station and an indoor dead zone ratio in each femtocell.

In step S1901, the management server 1550 calculates the interference detection ratio due to each femto base station within the same macro cell from the interference values measured and collected by the macro mobile stations. The interference detection ratio is calculated as (interference detection ratio)=(the number of reports that interference is detected/the number of macro mobile stations instructed to detect interference) for each femto base station. Examples of the above-mentioned interference detection include the cases where the reception levels at each macro mobile station, as well as the conditions described in the third exemplary embodiment are satisfied. In step S1903, the management server 1550 calculates a ratio A of femto base stations from which the interference detection ratio exceeds the threshold within the same macro cell. In step S1905, the management server 1550 calculates a ratio B of femto base stations at which the indoor dead zone ratio exceeds the threshold. In step S1907, the management server 1550 judges whether the ratio A of femto base stations from which the interference detection ratio exceeds the threshold is equal to or greater than a target value Th1, and judges whether the ratio B of femto base stations at which the indoor dead zone ratio exceeds the threshold is equal to or smaller than a target value Th2. When the ratio A and the ratio B satisfy the conditions of step S1907, the management server 1550 proceeds to step S1909, and decrements by ($\Delta$dB') the offset of the downlink transmission power of each femto base station within the same macro cell. On the other hand, when at least one of the ratio A and the ratio B does not satisfy the conditions of step S1907, the management server 1550 proceeds to step S1911.

In step S1911, the management server 1550 judges whether the ratio A of femto base stations from which the interference detection ratio exceeds the threshold is equal to or smaller than (target value Th1–$\Delta$5), and judges whether the ratio B of femto base stations at which the indoor dead zone ratio exceeds the threshold is equal to or greater than (target value Th2+$\Delta$6). When both the ratio A and the ratio B satisfy the conditions of step S1911, the management server 1550 proceeds to step S1913, and increments by ($\Delta$dB') the offset of the downlink transmission power of each femto base station within the same macro cell. When the both conditions of steps S1907 and S1911 are not satisfied, the management server 1550 maintains the current offset. In step S1915, the management server 1550 applies the parameter for the downlink transmission power held in all the femto base stations within the same macro cell. Specifically, in this exemplary embodiment, the offset of the downlink transmission power is controlled by a step of ($\Delta$dB') under the following conditions. The conditions are: the ratio A of femto base stations from which the interference detection ratio exceeds the threshold falls within a target range between the target value Th1 and (target value Th1–$\Delta$5); and the ratio B of femto base stations at which the indoor dead zone ratio exceeds the threshold falls within a target range between the target value Th2 and (target value Th2+$\Delta$6). This processing enables appropriate control of the trade-off between deterioration in quality due to the interference of the transmission power of each femto base station to each macro mobile station and deterioration in quality due to the interference of the transmission power of each macro mobile station to each femto base station. Note that the above-mentioned example illustrates the case where the downlink transmission power is increased and decreased by the same step width $\Delta$dB'. However, different step widths may be used.

Other Exemplary Embodiment

As a substitute for the management server, the macro base station may carry out collection of measurement results from each macro mobile station, determination of parameters, and notification to each femto base station. This case is equivalent to the case where the functions of the management server are present in each macro base station, since parameters are commonly set per macro base station. Further, each femto base station may perform distributed processing. In this case, the management server may only collect information and each femto base station in an idle state may perform operation or the like.

Though this exemplary embodiment illustrates the case where the reception levels are notified via wireless data communication from the macro base station 221 to each femto base station 211, the notification may be performed via a dedicated wired communication or a wired communication through a network. The radio communication system to which this exemplary embodiment is applied is not particularly limited. For example, this exemplary embodiment can be applied to various radio communication systems including specifications defined in LTE (Long Term Evolution), W-CDMA (Wideband Code Division Multiple Access), WLAN (Wireless Local Area Network), and IEEE (Institute of Electrical and Electronics Engineers) 802.16m.

While exemplary embodiments of the present invention have been described in detail above, a system or apparatus obtained by arbitrarily combining respective features included in the exemplary embodiments may also be included in the scope of the present invention.

The present invention may be applied to a system configured by a plurality of equipments, and may also be applied to a single device. Further, the present invention can be applied to the case where a control program for implementing the functions of the exemplary embodiments is directly or remotely provided to a system or device and executed. Accordingly, the control program to be installed in a computer to cause the computer to implement the functions of the present invention, a storage medium storing the control program, and a WWW (World Wide Web) server that allows the control program to be downloaded are also included in the scope of the present invention. The control program can be stored and provided to a computer using any type of non-transitory computer readable media. Non-transitory computer readable media include any type of tangible storage media. Examples of non-transitory computer readable media include magnetic storage media (such as floppy disks, magnetic tapes, and hard disk drives), optical magnetic storage media (such as magneto-optical disks), CD-ROM (Read Only Memory), CD-R, CD-R/W, and semiconductor memories (such as mask ROM, PROM (Programmable ROM), EPROM (Erasable PROM), flash ROM, and RAM (random access memory)). The control program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2010-217089, filed on Sep. 28, 2010, the disclosure of which is incorporated herein in its entirety by reference.

INDUSTRIAL APPLICABILITY

The present invention is applied to a radio communication system, a radio resource determination method therefor, a communication management device, and a control method and a control program for the communication management device. In particular, the present invention is applied to an application for determining a radio resource in a radio communication system composed of a plurality of first cells and a second cell including the plurality of first cells.

REFERENCE SIGNS LIST 100, 200, 1000, 1500 RADIO COMMUNICATION SYSTEM
103, 203, 1003, 1503 CALCULATION UNIT
104, 204, 1004, 1504 DETERMINATION UNIT
110 FIRST CELL
111 FIRST BASE STATION
112 FIRST MOBILE STATION
120 SECOND CELL
121 SECOND BASE STATION
122 SECOND MOBILE STATION
130 STATISTIC
203a, 221a, 1003a, 1003b, 1503a MEASUREMENT INSTRUCTION SIGNAL
204a, 1504a RADIO RESOURCE
210 FEMTOCELL
211 FEMTO BASE STATION
211a, 222c RADIO WAVE
211b, 211e, 212a RADIO SIGNAL
211d INDOOR DEAD ZONE RATIO
212 FEMTO MOBILE STATION
212b RSRQ
220 MACRO CELL
221 MACRO BASE STATION
221b, 1004a, 1004b TRANSMISSION DATA
222 MACRO MOBILE STATION
222a, 222b RECEPTION LEVEL
230, 553, 1853 FIRST STATISTIC
250, 1050, 1550 MANAGEMENT SERVER
321, 1134 MEASUREMENT INSTRUCTION ACQUISITION UNIT
322, 1135 MEASUREMENT EXECUTION UNIT
323, 1136 MEASUREMENT RESULT REPORTING UNIT
331, 1141 RADIO RESOURCE PARAMETER ACQUISITION UNIT
332, 1142 RADIO RESOURCE UPDATING UNIT
333, 1143 TRANSMISSION UNIT
373, 1175 MEASUREMENT INSTRUCTION UNIT
374, 1176 MEASUREMENT RESULT COLLECTING UNIT
375 FIRST STATISTIC CALCULATION UNIT
381, 1182, 1683 WIRELESS RESOURCE ADJUSTMENT UNIT
510, 1310, 1810 CPU
520, 1320, 1820 ROM
530, 1330, 1830 COMMUNICATION CONTROL UNIT
540, 1340, 1840 RAM
541-546, 1341-1345, 1841-1849 AREA
550, 1350, 1850 MASS STORAGE UNIT
551, 1351, 1851 INTERFERENCE MEASUREMENT RESULT DATABASE
552, 1852 FIRST STATISTIC CALCULATION ALGORITHM
554, 1354, 1857 RADIO RESOURCE MANAGEMENT PROGRAM
555 FIRST STATISTIC CALCULATION MODULE
556 FIRST PARAMETER CALCULATION MODULE
1030, 1353 SECOND STATISTIC
1177 SECOND STATISTIC CALCULATION UNIT

1352 SECOND STATISTIC CALCULATION ALGORITHM
1355 SECOND STATISTIC CALCULATION MODULE
1356 SECOND PARAMETER CALCULATION MODULE
1530, 1856 THIRD STATISTIC
1631 RSRQ-CDF CREATION UNIT
1632 INDOOR DEAD ZONE RATIO CALCULATION UNIT
1633 INDOOR DEAD ZONE RATIO REPORTING UNIT
1671 INDOOR DEAD ZONE RATIO COLLECTING UNIT
1672 THIRD STATISTIC CALCULATION UNIT
1854 INDOOR DEAD ZONE RATIO DATABASE
1855 THIRD STATISTIC CALCULATION ALGORITHM
1858 FIRST STATISTIC/THIRD STATISTIC CALCULATION MODULE
1859 THIRD PARAMETER CALCULATION MODULE

The invention claimed is:

1. A radio communication system including a plurality of first base stations and a plurality of first mobile stations respectively connected to the plurality of first base stations, the radio communication system comprising:
a calculation unit that calculates a statistic by aggregating measurements of interference levels of radio waves between the plurality of first base stations and second mobile stations connected to a second base station that forms a second cell larger than a first cell formed by each of the first base stations; and
a determination unit that determines, based on the statistic, a radio resource to be used by the plurality of first base stations or the plurality of first mobile stations.

2. The radio communication system according to claim 1, wherein the calculation unit is configured to calculate a cumulative probability distribution obtained by aggregating reception levels at the second mobile stations of radio waves from the plurality of first base stations, and
the determination unit is configured to determine an offset of downlink transmission power such that the reception level at which the cumulative probability distribution exceeds a predetermined probability is equal to or lower than a predetermined threshold, the offset being used by the plurality of first base stations.

3. The radio communication system according to claim 1, wherein the calculation unit is configured to calculate detection ratios of interference that are obtained by aggregating reception levels at the second mobile stations of radio waves from the plurality of first base stations, and to calculate a first ratio of first base stations from which the detection ratio of interference exceeds a predetermined value, and
the determination unit is configured to determine an offset of downlink transmission power such that the first ratio falls within a first target range, the offset being used by the plurality of first base stations.

4. The radio communication system according to claim 1, wherein the calculation unit is configured to calculate detection ratios of interference that are obtained by aggregating reception levels at the second mobile stations of radio waves from the plurality of first base stations, and to calculate an average value of the detection ratios of interference, and
the determination unit is configured to determine an offset of downlink transmission power such that the average value falls within a second target range, the offset being used by the plurality of first base stations.

5. The radio communication system according to claim 1, wherein the calculation unit is configured to calculate detection ratios of interference that are obtained by aggregating reception levels at the second mobile stations of radio waves from the plurality of first base stations, and to calculate a second ratio of first base stations from which the detection ratio of interference exceeds a predetermined value, and
the determination unit is configured to determine a space propagation loss such that the second ratio falls within a third target range, the space propagation loss being used by the plurality of first base stations to calculate a building penetration loss.

6. The radio communication system according to claim 1, wherein the calculation unit is configured to calculate detection ratios of interference that are obtained by aggregating reception levels at the second mobile stations of radio waves from the plurality of first base stations, and to calculate a third ratio of first base stations from which the detection ratio of interference exceeds a predetermined value, and
the determination unit is configured to determine a reception quality target value of the plurality of first base stations such that the third ratio falls within a fourth target range.

7. The radio communication system according to claim 1, wherein the calculation unit is configured to calculate detection ratios of interference that are obtained by aggregating reception levels at the plurality of first base stations of radio waves from the second mobile stations, and to calculate a fourth ratio of first base stations to which the detection ratio of interference exceeds a predetermined value, and
the determination unit is configured to determine a parameter for an uplink transmission power such that the fourth ratio falls within a fifth target range, the uplink transmission power parameter being used by the plurality of first mobile stations.

8. The radio communication system according to claim 1, wherein the calculation unit is configured to calculate a first statistic obtained by aggregating reception levels at the second mobile stations of radio waves from the plurality of first base stations, or to calculate a second statistic obtained by aggregating reception levels at the plurality of first base stations of radio waves from the second mobile stations, and
the determination unit is configured to determine a radio resource to be used by the plurality of first base stations based on the first statistic, or to determine a radio resource to be used by the plurality of first mobile stations based on the second statistic.

9. The radio communication system according to claim 1, wherein the calculation unit is configured to calculate a first statistic obtained by aggregating reception levels at the second mobile stations of radio waves from the plurality of first base stations, and a second statistic obtained by aggregating reception levels at the plurality of first base stations of radio waves from the second mobile stations, and
the determination unit is configured to determine a radio resource to be used by the plurality of first base stations and a radio resource to be used by the plurality of first mobile stations, based on the first statistic and the second statistic.

10. The radio communication system according to claim 1, wherein the calculation unit is configured to further calculate, as the statistic, a value obtained by aggregating reception levels at the first mobile stations of radio waves from the plurality of first base stations, and the determination unit is configured to determine a radio resource to be used by the plurality of first base stations base on the statistic.

11. The radio communication system according to claim 10,
wherein the calculation unit is configured to calculate a first statistic obtained by aggregating reception levels at the second mobile stations of radio waves from the plurality of first base stations, and a third statistic obtained by aggregating reception levels at the first mobile stations of radio waves from the plurality of first base stations, and
the determination unit is configured to determine a radio resource to be used by the plurality of first base stations based on the first statistic and the third statistic.

12. The radio communication system according to claim 11,
wherein the calculation unit is configured to calculate:
detection ratios of interference that are obtained by aggregating reception levels at the second mobile stations of radio waves from the plurality of first base stations;
a fifth ratio of first base stations from which the detection ratio of interference exceeds a predetermined value;
ratios of indoor dead zones that are obtained by aggregating reception levels at the first mobile stations of radio waves from the plurality of first base stations; and
a sixth ratio of first base stations by which the ratio of indoor dead zones exceeds a predetermined value, and
the determination unit is configured to determine an offset of downlink transmission power such that the fifth ratio falls within a sixth target range and the sixth ratio falls within a seven target range, the offset being used by the plurality of first base stations.

13. The radio communication system according to claim 1, further comprising:
a communication management device that manages the plurality of first base stations and the plurality of first mobile stations,
wherein the communication management device includes at least one of the calculation unit and the determination unit.

14. A method of determining a radio resource in a radio communication system that includes a plurality of first base stations and a plurality of first mobile stations respectively connected to the plurality of first base stations, the method comprising:
calculating a statistic by aggregating measurements of interference levels of radio waves between the plurality of first base stations and second mobile stations connected to a second base station that forms a second cell larger than a first cell formed by each of the first base stations; and
determining, based on the statistic, a radio resource to be used by the plurality of first base stations or the plurality of first mobile stations.

15. A communication management device that manages a plurality of first base stations and a plurality of first mobile stations respectively connected to the plurality of first base stations, the communication management device comprising:
a calculation unit that calculates a statistic by aggregating measurements of interference levels of radio waves between the plurality of first base stations and second mobile stations connected to a second base station that forms a second cell larger than a first cell formed by each of the first base stations; and
a determination unit that determines, based on the statistic, a radio source to be used by the plurality of first base stations or the plurality of first mobile stations.

16. A method of controlling a communication management device that manages a plurality of first base stations and a plurality of first mobile stations respectively connected to the plurality of first base stations, the method comprising:
calculating a statistic by aggregating measurements of interference levels of radio waves between the plurality of first base stations and second mobile stations connected to a second base station that forms a second cell larger than a first cell formed by each of the first base stations; and
determining, based on the statistic, a radio resource to be used by the plurality of first base stations or the plurality of first mobile stations.

17. A non-transitory computer readable medium storing a program for controlling a communication device that manages a plurality of first base stations and a plurality of first mobile stations respectively connected to the plurality of first base stations, the program causing a computer to execute:
calculating a statistic by aggregating measurements of interference levels of radio waves between the plurality of first base stations and second mobile stations connected to a second base station that forms a second cell larger than a first cell formed by each of the first base stations; and
determining, based on the statistic, a radio resource to be used by the plurality of first base stations or the plurality of first mobile stations.

* * * * *